(12) United States Patent
Simon

(10) Patent No.: US 11,685,522 B2
(45) Date of Patent: Jun. 27, 2023

(54) LIFT ROTOR AND VERTICAL OR SHORT TAKE-OFF AND/OR LANDING HYBRID AERODYNE COMPRISING SAME

(71) Applicant: INNOSTAR, Chatillon (FR)

(72) Inventor: Jean-Michel Simon, Chatillon (FR)

(73) Assignee: INNOSTAR, Chatillon (FR)

( * ) Notice: Subject to any disclaimer, the term of this patent is extended or adjusted under 35 U.S.C. 154(b) by 0 days.

(21) Appl. No.: 15/749,356

(22) PCT Filed: Jul. 18, 2016

(86) PCT No.: PCT/FR2016/051835
§ 371 (c)(1),
(2) Date: Jan. 31, 2018

(87) PCT Pub. No.: WO2017/021608
PCT Pub. Date: Feb. 9, 2017

(65) Prior Publication Data
US 2018/0222579 A1    Aug. 9, 2018

(30) Foreign Application Priority Data

Jul. 31, 2015 (FR) ...................................... 15 57364

(51) Int. Cl.
*B64C 27/473* (2006.01)
*B64C 27/32* (2006.01)
*B64C 27/00* (2006.01)
*B64C 29/00* (2006.01)
(Continued)

(52) U.S. Cl.
CPC .......... *B64C 27/473* (2013.01); *B64C 27/008* (2013.01); *B64C 27/20* (2013.01); *B64C 27/30* (2013.01); *B64C 27/32* (2013.01); *B64C 29/0008* (2013.01)

(58) Field of Classification Search
CPC ....... B64C 27/008; B64C 27/20; B64C 27/30; B64C 27/32; B64C 27/473
See application file for complete search history.

(56) References Cited

U.S. PATENT DOCUMENTS 2,471,687 A * 5/1949 Gifford ................. B64C 27/001
416/19
2,475,318 A   7/1949 Gluhareff
(Continued)

*Primary Examiner* — David E Sosnowski
*Assistant Examiner* — Aye S Htay
(74) *Attorney, Agent, or Firm* — Muncy, Geissler, Olds & Lowe, P.C.

(57) ABSTRACT

The rotor of a hybrid aerodyne for producing lift by rotating during a stage of vertical flight and then for being held stationary and stored longitudinally during a stage of cruising flight has at least one single-blade with a counterweight. The length of the active blade that generates lift of the rotor while rotating is significantly shorter than the length of the radius of the rotor. The portion that carries the active blade that makes the connection between the active blade and rotor mast is structurally rigid. The rigid portion that carries the active blade presents a cross-section optimized to provide zero or almost zero lift and very little aerodynamic drag while the rotor is rotating. The assembly is hinged about a transverse axis perpendicular to the vertical axis of the rotor and substantially on the vertical axis of the rotor mast.

27 Claims, 10 Drawing Sheets

(51) Int. Cl.
*B64C 27/30* (2006.01)
*B64C 27/20* (2023.01)

(56) References Cited

U.S. PATENT DOCUMENTS

| | | | | |
|---|---|---|---|---|
| 2,837,301 | A * | 6/1958 | Jenney | B64C 29/0025 |
| | | | | 244/7 R |
| 2,949,254 | A | 8/1960 | Bauer | |
| 3,074,487 | A | 1/1963 | Derschmidt | |
| 3,693,910 | A * | 9/1972 | Aldi | B64C 27/30 |
| | | | | 244/7 A |
| 3,884,431 | A | 5/1975 | Burrell | |
| 6,234,422 | B1 * | 5/2001 | Bolonkin | B64C 27/026 |
| | | | | 244/17.11 |
| 6,293,491 | B1 * | 9/2001 | Wobben | B64C 27/00 |
| | | | | 244/17.23 |
| 6,340,133 | B1 * | 1/2002 | Capanna | B64C 29/0083 |
| | | | | 244/12.3 |
| 6,619,585 | B1 * | 9/2003 | Lidak | B64C 27/32 |
| | | | | 244/17.11 |
| 6,923,404 | B1 * | 8/2005 | Liu | B64C 3/40 |
| | | | | 244/46 |
| 8,376,264 | B1 * | 2/2013 | Hong | B64C 27/26 |
| | | | | 244/17.23 |
| 9,334,049 | B1 * | 5/2016 | LeGrand, III | B64C 27/473 |
| 9,598,169 | B1 * | 3/2017 | LeGrand, III | B64C 27/473 |
| 10,029,785 | B2 * | 7/2018 | Niedzballa | B64C 27/30 |
| 10,137,982 | B1 * | 11/2018 | Dormiani | B64C 27/26 |
| 2007/0059175 | A1 * | 3/2007 | Mazet | B64C 27/322 |
| | | | | 416/143 |
| 2017/0233069 | A1 * | 8/2017 | Apkarian | B64F 5/10 |
| | | | | 244/7 R |

* cited by examiner

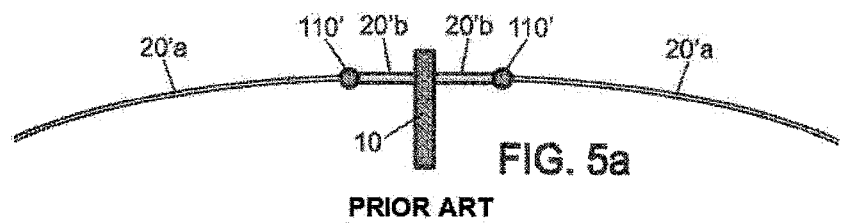
FIG. 5a
PRIOR ART
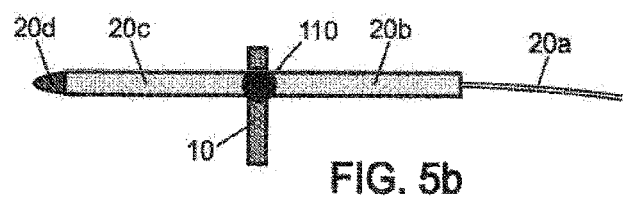
FIG. 5b
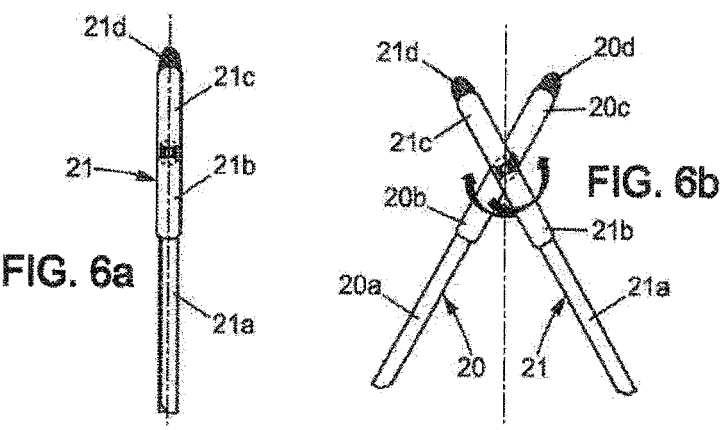
FIG. 6a
FIG. 6b
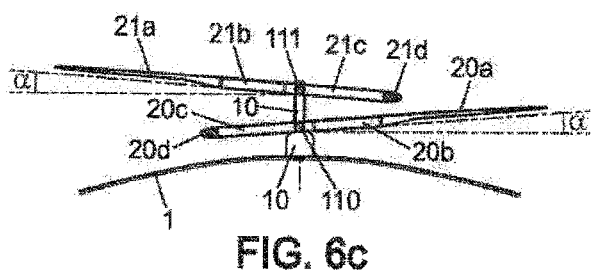
FIG. 6c

LIFT ROTOR AND VERTICAL OR SHORT TAKE-OFF AND/OR LANDING HYBRID AERODYNE COMPRISING SAME

BACKGROUND OF THE INVENTION

Field of the Invention

The invention relates to a lift rotor or rotor system for a vertical or short takeoff and/or landing hybrid aerodyne, enabling the aerodyne to take off and/or land vertically or over short distances, and then to move horizontally at high speed, the hybrid aerodyne being of the type fitted with a fixed wing and with a rotary wing that is suitable for being held stationary during cruising flight.

The invention applies in particular to small aerodynes having a relatively short wing span (e.g. 4 meters (m)) traveling at a relatively high speed (e.g. 350 kilometers per hour (km/h)) and for use in coastal surveillance missions or indeed missions for surveillance of railways or roads over long distances, or even medical assistance/evacuation transportation over long distances in zones that are relatively uninhabited, given that aerodynes are capable of taking off from any location and in particular without requiring a specific takeoff runway or infrastructure. Typically, the aerodyne may be of the ultralight or light sport aircraft (LSA) type, e.g. having a rotor with a diameter of 3 m and a 150 kilowatt (kW) power plant, capable of traveling at a cruising speed of about 350 km/h and of traveling over a distance of the order of 1000 kilometers (km). In order to achieve such performance, it is necessary for the rotor or rotor system of the present invention to provide high performance lift, but also for it not to generate excessive drag during horizontal travel at high speed of the aerodyne. For this purpose, the invention proposes firstly using a rotor or rotor system that is made up mainly by at least two single-blades rotating in contrarotating manner (in opposite directions to each other), and secondly providing means for stopping rotation of said single-blades during cruising flight and for holding them safely in position with minimum aerodynamic drag.

Brief Description of the Related Art

The idea of using one or more single-blades in "stop rotor" designs for vertical takeoff or landing (VTOL) hybrid aircraft is an idea that has existed for a very long time. It is in the public domain. Specifically, in obvious manner, a single-blade is advantageous in terms of rotor drag when rotation of the rotor is stopped. It is also a good solution when it is desired to design a system in which the rotor is hidden (sheltered from the relative airflow) during flight at high speed. For example, in this field, the following patents may be mentioned:

Aldi (1970/U.S. Pat. No. 3,693,910);
Burrel (1975/U.S. Pat. No. 3,884,431);
Bolonkin (2001/U.S. Pat. No. 6,234,422);
Capanna (2002/U.S. Pat. No. 6,340,133); and
Hong (2009/U.S. Pat. No. 8,376,264).

All of those inventors, and others who have not been mentioned, have envisaged using rotors having single-blades with or without counterweights during takeoff and landing, and then storing them horizontally and/or hiding them in the structure of the aerodyne so that they do not create excessive aerodynamic hindrance while the aerodyne is flying horizontally at high speed, i.e. at a speed that is high enough for the lift and the maneuverability of the aerodyne to be provided by its fixed wing and by its tail fins and planes for rudder and elevator control, that are associated therewith in well-known manner.

Furthermore, patents U.S. Pat. Nos. 2,471,687, 2,475,318, 2,949,254, 3,074,487, and 6,619,585 describe single-blade rotors with balancing counterweights for helicopters.

None of those systems has seen genuine development and commercialization.

In the Applicants' opinion, the reasons that have led to failure of such systems, and that makes it easier to understand the advantage of the present invention, are as follows:

When the rotor is to be hidden, that leads firstly to mechanisms that are too complicated, and secondly to situations of aerodynamic instability for the rotor when it is put into shelter, after takeoff during the transition to cruising flight, and also at the time when it is uncovered for landing purposes.

When the rotor is not covered but is left free in the air stream (relative airflow) in cruising flight, if the rotor disk loading (measured in newtons per square meter ($N/m^2$)) is appropriate for having reasonable takeoff power, that assumes that the rotor is of large diameter, and consequently a considerable blade length that leads to instabilities when stopping and/or restarting the rotor, when the rotor looses the stabilizing effect of centrifugal force. Specifically, in order to be aerodynamically effective, the blades of a rotor need to be relatively narrow and thus relatively flexible, and to present good aero-elastic performance, like the blades of modern helicopter rotors.

When the rotor disk loading is large, the blades are shorter and stiffer and thus more stable, but the power needed for providing lift is very high, which goes against the advantage of the concept. It is also possible to increase the number of rotors with blades that are stiff and short in length, but the complexity of power transmission then makes such a concept uncompetitive.

Finally, it is possible to use two single-blades rotating in opposite directions, i.e. contrarotating blades. For example, helicopters of the Kamov type make use of contrarotating rotors. Despite the advantages offered by this type of contrarotating concept, the complexity of simultaneously controlling both collective pitch and also cyclic pitch at two levels along the axis of the rotor while using a contrarotating rotor means that this design is mechanically complex and fragile, and is therefore not in widespread use.

SUMMARY OF THE INVENTION

The invention proposed by the Applicants solves those contradictions and makes it possible to propose an overall design for a rotor or rotor system that can simultaneously provide lift effectively during stabilized flight, and that can also be stopped and then put back into rotation completely safely during or after cruising flight at high speed.

The main characteristics of the rotor proposed by the invention are as follows:

A rotor constituted by at least two single-blades, each having a counterweight and the blades contrarotating about a common axis or each rotating about respective ones of at least two axes that are offset along the roll axis of the aerodyne. The blades, the counterweights, and the arms carrying the counterweights are streamlined aerodynamically so as to offer minimum resistance to forward movement during cruising flight.

The active portion of the blade (the portion that presents an airfoil and produces lift) is short in length compared with the radius of the rotor; it travels over an annular surface at the periphery of the rotor disk, thus making it possible firstly to use the most effective portion of the blade for lift, and secondly to limit the bending of the blade (which varies with the cube of its length), and thus limit instabilities when stopping the rotor or putting it back into rotation.

Collective pitch variation: the pitch of the blades can be changed in collective manner only, thereby greatly simplifying the pitch adjustment mechanism. The absence of cyclic pitch variation is compensated by the presence of attitude fans, e.g. at the end of the fuselage and/or of the wings of the fixed wing of the aerodyne, which attitude fans enable the roll and the pitching of the aerodyne to be corrected.

In order to have an acceptable figure of merit (FOM), it is necessary to have good rotor disk loading (<450 N/m$^2$), i.e. an area for the rotor disk that is large enough given the total weight of the aerodyne.

In order to hold the single-blades rigidly stationary during cruising at high speed, it is necessary to have a rigid portion (counterweight arm+portion carrying the active portion of the blade) that is rigidly fastened to the rotor mast.

The single-blades move in contrarotating manner starting from an initial "zero" position that lies substantially along the roll axis of the aerodyne (counterweight towards the front and active blade towards the rear relative to the travel direction of the aerodyne in cruising flight). The centrifugal forces on each blade are balanced by the corresponding counterweight so as to avoid creating vibration in the rotor mast.

The single-blades must be hinged to the rotor mast with a rocker hinge of very small stiffness so as to avoid generating back-and-forth torque on the rotor mast during rotation of the single-blades. When the rotor is stopped, for example during cruising flight, this hinge of very small stiffness must be locked in order to secure the single-blades firmly in the "horizontal" position (i.e. substantially in alignment with the roll axis of the aerodyne).

The single-blades present asymmetrical aerodynamic profiles in their central portions over the so-called "rigid" portions, thereby greatly facilitating restarting the rotor in flight (or putting it back into rotation), and making it possible to "off-load" the driving power applied to the rotor with the help of "natural" drive associated with the forces of the "relative airflow" on the rotor, during (horizontal) movement of the aerodyne in cruising flight.

To this end, the invention provides a rotor for a hybrid aerodyne having a fixed wing and a rotary wing suitable for being held stationary in cruising flight of the aerodyne, the rotor being suitable for producing lift by rotating during a stage of vertical flight and for being held stationary and stored longitudinally during a stage of cruising flight, the rotor being of the type comprising at least one single-blade with a counterweight, said single-blade comprising:

an active blade that generates the lift of the rotor during rotation;

a first portion that carries said active blade and that constitutes the connection between the active blade and a rotor mast; and a second portion that carries said counterweight and that constitutes the connection between the counterweight and said rotor mast, the length of the active blade in its span direction being less than the radius R of the rotor;

said portion carrying the active blade being a portion that is structurally rigid, in particular against bending and twisting;

said portion carrying the active blade presenting a cross-section of aerodynamic profile having zero or almost zero lift when the rotor is in rotation; and the assembly constituted by the active blade and the rigid portion carrying the active blade being hinged about a transverse axis perpendicular to the axis of rotation of the rotor, substantially at said axis of rotation of the rotor mast, and the longitudinal axis of said active blade and of said rigid portion carrying the active blade intersects said axis of rotation, the rotor being characterized in that it comprises at least two substantially identical single-blades rotating in opposite directions, each about a respective one of axes of rotation that are longitudinally spaced apart along the roll axis of the aerodyne, or that are contrarotating about a common axis of rotation of the rotor mast, and in that, during cruising flight, each single-blade is stopped and locked longitudinally in such a manner that the counterweight is oriented towards the front of the aerodyne and the active blade is oriented towards the rear of the aerodyne, substantially in the direction of the roll axis of the aerodyne, and that, during vertical flight, the at least two single-blades rotate in opposite directions at the same angular speed from an initial zero position, which is said longitudinally stopped position.

Advantageously, the rotor (or rotor system) of the invention also comprises at least one of the following characteristics:

the length of the active blade along its longitudinal axis is less than 75% of the radius R of the rotor, and preferably lies in the range 50% to 70% of the radius R;

said portion carrying the counterweight is substantially analogous to the portion carrying the active blade in that it is structurally rigid and of cross-section of aerodynamic profile presenting zero or almost zero lift when the rotor is in rotation;

the length of the rigid portion carrying the counterweight along the longitudinal axis of the active blade is substantially equal to the length of the rigid portion carrying the active blade;

the portion carrying the counterweight and the portion carrying the active blade form a single continuous and rigid structure pivotally hinged about said transverse axis at said axis of rotation of the rotor;

the portion carrying the counterweight is driven in rotation like the portion carrying the active blade, but remains constantly perpendicular to the axis of rotation of the rotor during all stages of flight of the aerodyne;

the counterweight conserves a degree of freedom to move longitudinally under the control of a balancing device in proportion to the cone angle made by the active blade with the so-called "horizontal" plane defined by the roll and pitching axes of the aerodyne, so as to cause the counterweight to approach the rotor mast when the cone angle of the blade increases, so as to balance centrifugal forces on either side of the rotor mast;

the two rigid portions, one carrying the active blade and the other carrying the counterweight, are secured to each other and form a single structure that is both rigid and aerodynamically profiled so as to avoid generating aerodynamic lift in rotation, while also being hinged about a transverse axis situated exactly at the axis of rotation of the rotor;

a mechanical balancing device is arranged at least in part inside the rigid portion carrying the counterweight so as to cause said counterweight to move towards the axis of rotation of the rotor when the cone angle made by the active blade with the so-called "horizontal" plane increases, so as to balance centrifugal forces, regardless of the position of the active blade;

the rotor is driven in rotation by a drive device masked inside the rigid portion carrying the counterweight, said drive device allowing lead/lag movements in rotation about the axis of rotation of the rotor so as to damp variations in the lead/lag forces of the active blade, said drive device including a damped drive abutment system;

the angular pitch or "blade angle" of the active portion has an angle of incidence that is controlled by a longitudinal shaft system held and mounted to turn about its own axis by bearings and abutments, said shaft passing through the rigid portion carrying the active blade and being constrained, at its radially outer end relative to the axis of rotation of the rotor, to move in rotation with the root of said active blade, and being controlled by a pitch control rod connected by a pitch lever to the radially inner end of said shaft;

the angular pitch or "blade angle" of the active blade is constant and optimized to offer maximum lift at the nominal speed of rotation of the rotor;

the pitch of the active blades of the single-blades is adjusted collectively only, for equipping an aerodyne in which roll and pitching movements are controlled by stabilizer systems that are preferably located at the tips of the wings and/or at the ends of the fuselage;

a motor-driven drive train for rotating the rotor at the end of cruising flight comprises firstly a main fuel-burning engine of the four- or two-stroke piston engine type or of the gas turbine type, driving a drive power transmission shaft via a clutch and a freewheel, and a transmission gearbox connected to the rotor mast for providing vertical flight, and secondly a brake on the power transmission shaft, a secondary motor, preferably an electric motor, coupled by a clutch and a freewheel to a power transmission engaged with the transmission shaft downstream from the brake, in order to stop the single-blades of the rotor and position them longitudinally, and also in order to set the rotor into rotation;

a secondary motor-driven drive train of low power, e.g. 10% of the main power, comprises an auxiliary motor connectable via at least one clutch and a freewheel to said power transmission shaft and is declutchable and suitable for being used during all transient stages of flight and also in the event of a malfunction of the main engine, a pusher or puller propeller being suitable for being driven in cruising flight by the main engine, and in an emergency by the auxiliary motor;

at least one and preferably both of said rigid portions respectively carrying the active blade and the counterweight is/are profiled in such a manner as to offer different aerodynamic resistances depending on the orientation of the relative airflow, with a profile of elliptical type on the leading edge, and preferably a "recessed" profile on the trailing edge, each profile being oriented opposite to the other, and oppositely from one rigid portion to the other, in such a manner that when the aerodyne is in cruising flight, the relative airflow reduces torque on the two rigid portions driving the rotor, tending to cause the active blade to turn in the direction that enables it to generate lift;

at least one retractable mechanical locking element that is suitable for being masked in the structure of the aerodyne is arranged in such a manner as to lock the rotor mechanically during cruising flight by bearing against at least one protuberance arranged on the rigid portion carrying an active blade and/or on the corresponding counterweight or the rigid portion carrying said counterweight;

at least one mechanical locking device for locking the rigid portion carrying the active blade is provided, said locking device being secured firstly to the rotor mast and secondly having a locking element that is engageable in a female portion secured to the rigid portion carrying the active blade, and supporting a flyweight while being subjected to urging from at least one spring, the device being arranged in such a manner that centrifugal force, which acts on the flyweight when the rotor is rotating, serves to release the locking device that locks the blade in the horizontal position when the rotor is stopped;

said counterweight is placed at the end of an extender element extending the rigid portion carrying the counterweight, said extender element having a profile that is either cylindrical and substantially circular, or else that is oval and oriented so as to reduce aerodynamic resistance when the rotor is rotating and a large vertical air stream is generated by the active blade, or else is surrounded by an aerodynamically profiled fairing that is free to turn so as to become oriented so as to reduce aerodynamic resistance regardless of the direction of the air stream;

the rotor is driven in rotation during vertical flight by ejecting compressed air, preferably from the counterweight advantageously carried by an extender element of the rigid portion carrying the counterweight, with the distance r between the mean air ejection point from the axis of the rotor being such that the ratio r/R lies in the range 55% to 85%, where R is the radius of the rotor, and/or at the end of the active blade;

a rotor synchronizing and restarting gearbox is associated with a brake and with at least one electric motor together with its transmission system;

the tip of the active blade is provided with a fin steering device that can be raised by pivoting about the longitudinal axis of the active blade such that when the rotor is no longer driven in rotation, said fin is raised and subjected to the effect of the relative airflow so that the corresponding single-blade is oriented substantially along the direction of the roll axis of the aerodyne; and at least one single-blade has two active blades carried by the same rigid portion and spaced apart from each other in a V-configuration having an angle of at least 30°, lying substantially in the plane of the corresponding rotor disk.

The invention also provides an aerodyne of hybrid type, as defined above, characterized in that it is fitted with a rotor in accordance with one or more of the above-specified characteristics, for vertical flight, and with a fixed wing, preferably a wing of the "canard" type or wings of the "tandem" type, supported by a fuselage, and fitted with stabilizer systems at the tips of the wings and/or at the end(s) of the fuselage in order to control roll and pitching movements of the aerodyne, together with at least one propeller, preferably a pusher propeller, for propelling the aerodyne during cruising flight.

Advantageously, the stabilizer systems at the tips of the wings and/or at the end of the fuselage for controlling roll and pitching movements of the aerodyne are made in substantially the same manner as the main vertical flight lift rotor, but on a smaller scale, corresponding to the functions of said stabilizer systems, and with at least one single-blade with a counterweight.

BRIEF DESCRIPTION OF THE DRAWINGS

The invention can be better understood and other characteristics and advantages of the invention appear from the following description of embodiments given as non-limiting examples, and made with reference to the accompanying drawings, in which:

FIGS. 5a and 5b are diagrammatic lateral elevation views respectively of a conventional helicopter rotor and of a rotor of the invention, for comparison purposes;

FIGS. 6a, 6b, and 6c are firstly two diagrammatic plan views and thirdly a face view of a rotor of the invention of the kind shown in FIGS. 3a and 3b, respectively when stopped during cruising flight (FIG. 6a) and while rotating in vertical flight for FIGS. 6b and 6c;

FIG. 7b is a fragmentary diagrammatic view in lateral elevation of a device for balancing centrifugal forces for each of the single-blades of a rotor according to FIG. 7a;

DETAILED DESCRIPTION OF THE PREFERRED EMBODIMENTS

Throughout the description below, the same numerical or alphanumerical references are used to designate elements that are identical or analogous in the various embodiments shown in the figures, and apart from the portion of the description given with reference to FIGS. 1a, 1b, 9, 16a, and 16b, the device described is solely the rotor system of the aerodyne for providing vertical lift. Except with reference to FIG. 9, no detailed description is given specifically of the power plant, or of the transmission of power from the power plant to the propeller(s), or of the fuselage for carrying passengers and/or a cargo.

In all of the figures showing one or more single-blades locked in a stationary position, in "horizontal" cruising flight, the longitudinal axis X of a single-blade is an axis parallel to the roll axis or is the roll axis, going towards the front of the aerodyne, and thus in the travel direction of the aerodyne in horizontal flight, and more generally, apart from stages of vertical takeoff and landing, the axis X extends in the longitudinal direction of the aerodyne, while the transverse hinge axis Y of the single-blade(s) is an axis parallel to the pitching axis or is the pitching axis, extending transversely relative to the longitudinal axis and perpendicular relative thereto, being itself generally horizontal in a stabilized flight configuration of the aerodyne, and the axis Z is the or one of the axes of rotation of the rotor system, and parallel to the yaw axis, or is the yaw axis, perpendicular to the plane defined by the axes X and Y, and is thus normally vertical, in a stabilized flight configuration of the aerodyne.

Figure 1A:
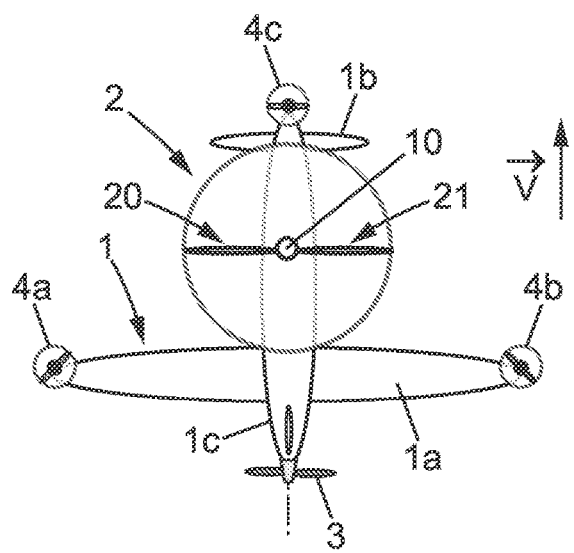
FIGS. 1a and 1b are diagrammatic plan views of a first example of an aerodyne of the invention respectively during a stage of vertical flight and during a stage of cruising flight.
Figure 1B:
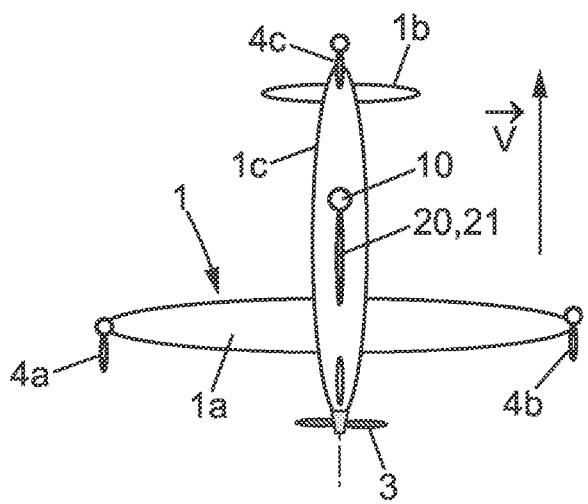

FIGS. 1a and 1b are two plan views respectively in hovering flight and in "horizontal" or cruising flight, for a first example aerodyne that is fitted with a lift rotor of the invention. In this configuration (which is not necessarily the only configuration), it comprises a "canard" fixed wing type aerodyne 1 with rear main wings 1a and a canard wing 1b at the front of the fuselage 1c, and it is fitted with attitude fans 4a, 4b at the tips of the wings 1a at the rear of the aerodyne, and also with a fan 4c at the front end of the fuselage 1c, in front of the canard wing 1b, in order to control the aerodyne 1 in roll and in pitching. The rotor 2 of the invention enables this aerodyne 1 to take off vertically (FIG. 1a), and then after stopping and locking said rotor 2 in a horizontal position in alignment with the roll axis, it enables it to travel at a high cruising speed V (FIG. 1b) while being propelled by a pusher propeller (3). At the end of cruising, when the aerodyne 1 slows down, the rotor 2 is restarted in rotation and the aerodyne 1 lands vertically.

The component elements of FIG. 1 comprise firstly the rotor 2 that enables the airplane to move up and down vertically, and secondly the fuselage 1c of the airplane (1) with the rear wing 1a, the front canard wing 1b, and a pusher propeller (3). Finally, the airplane 1 has stabilizer elements 4a, 4b, and 4c at each end of the rear wing 1b and at the front end of the fuselage 1c. In this representation, the stabilizer elements are preferably electrically-driven rotors that subsequently, during the flight, are either stopped in a minimum-drag position, or else hidden in the structure (wings 1a or fuselage 1c).

Alternatively, the stabilizer systems 4a, 4b, 4b may also be arranged using primary jets of compressed air taken from the outlet of the compression stages of a compressor or from a gas turbine, such as the gas turbine that might drive the propeller 3.

Figure 2A:
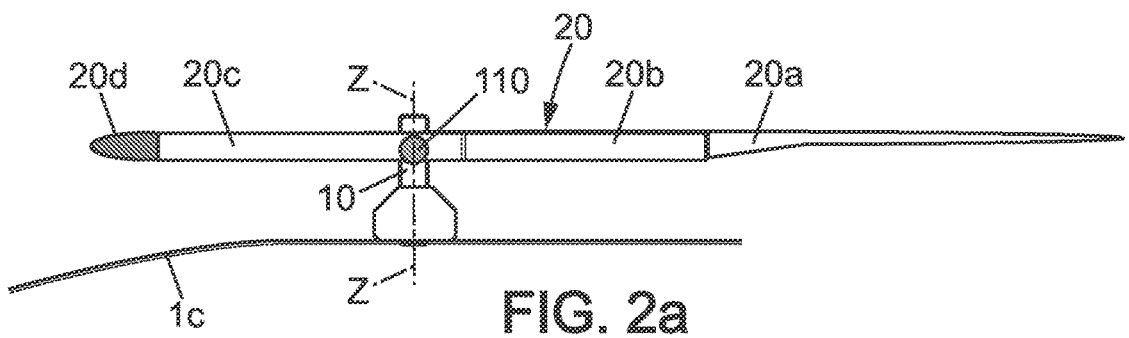
FIGS. 2a and 2b are diagrammatic views of a first example of a single-blade for a rotor of the invention, shown respectively in lateral elevation and in plan view.
Figure 2B:
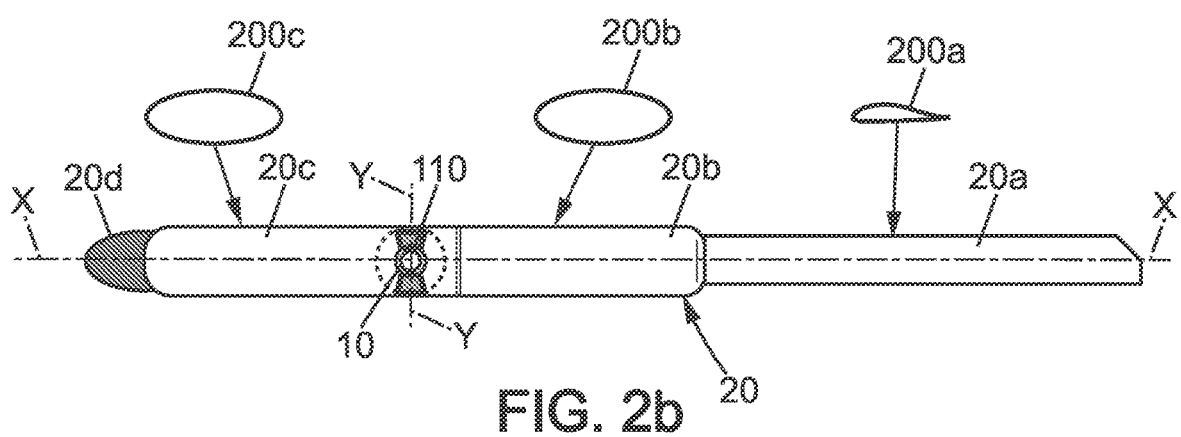

FIGS. 2a and 2b show a preferred embodiment of the single-blade rotor of the invention. FIGS. 2a and 2b are respectively a side view of the rotor while stopped during cruising flight, and a plan view of the rotor while stopped. It is a rotor constituted by a single-blade 20 that includes a counterweight 20d for balancing the centrifugal forces created by the single-blade itself. The single-blade assembly 20 is constituted mainly by three portions 20a, 20b, and 20c, together with the counterweight 20d.

The active blade 20a itself, which has a conventional wing profile 200a, provides the major part of the lift. Its effective length in the span direction along its longitudinal axis is considerably shorter than what it would be for a conventional rotor. In this example, its length is less than 75% of the length of the radius of the rotor, and preferably lies in the range 50% to 70% of the radius of the rotor. This reduction in the length of the active blade 20a is particularly important for stability in flight and while stopping the rotor and restarting it (setting it back into rotation), since the reduction in length makes it possible firstly to provide a blade structure that is rigid in bending and in twisting while also providing a wing profile 200a for the active blade 20a that is relatively fine and efficient from an aerodynamic point of view, and thus providing the rotor with good lift efficiency, and secondly, as described below, it avoids making the active blade 20a operate in a "stagnation" zone for the "descending" (retreating) blade during cruising flight of the aerodyne at a horizontal speed that, with a conventional helicopter rotor architecture, would involve approximately the one-fourth of the blade that is closest to the rotor mast 10.

The rigid portion 20b constitutes the attachment or attachment arm for attaching the active blade 20 to the rotor mast 10, so its length is of the order of 25% to 50% of the radius of the rotor. It is both very rigid in bending and in twisting, and also well profiled aerodynamically concerning rotation of the rotor, by having an oblong or oval profile 200b so as to minimize its drag while the rotor is in rotation. Its third characteristic that is very important for the invention is that the lift of the portion 20b is zero or almost zero. Specifically, in order to obtain a profile for the portion 20b that is rigid in bending, it is necessary to use a beam that is very thick, which would give rise to poor lift efficiency and thus to significant drag that would contribute to degrading the efficiency of the rotor by generating a large resisting torque. To clarify what is understood as great stiffness in bending for the portion 20b, it is desirable, by way of example, for the droop at the end of the portion 20b under the effect of its own weight and of the weight of the active blade 20a to be less than a few % of its length, e.g. less than 2% of its length.

The carrier portion 20c or carrier arm for carrying the counterweight 20d is likewise characterized like the portion 20b by:

very great stiffness in bending and twisting;

a cross-section 200c of oblong or oval shape, having the main characteristic of opposing minimum aerodynamic resistance during rotation of the single-blade; and almost zero lift during rotation of the single-blade.

The portion 20c has a length that is substantially equal to the portion 20b.

The portions 20b and 20c do not contribute to lift. Lift is provided essentially by the active blade 20a. In marginal manner, a small amount of lift (less than 5% of the total lift) may be arranged for the attachment portion 20b, but the effectiveness of this lift in terms of efficiency is bad.

It should be emphasized at this point that when a helicopter travels with a horizontal speed V, that speed is added to the speed of rotation on the "rising" (or advancing) path of the blade and is subtracted from the speed of rotation on the "retreating" (or descending) path. Thus, in the region of the blades close to the rotor mast of a helicopter moving in translation, the relative speed becomes negative, and this zone becomes a "stagnant" zone, which has little positive impact on the lift of the rotor.

The portion 20b is hinged at 110 to the rotor mast 10 to pivot about a transverse axis YY parallel to the pitching axis when the single-blade is stopped. As explained below, unlike a conventional helicopter rotor, where the flapping hinges are slightly offset relative to the rotor mast, in this invention, it is essential for the hinge 110 to be at the rotor mast 10, so that the axis of rotation ZZ intersects and is perpendicular to the axis YY, which also intersects and is substantially perpendicular to the longitudinal axis of the single-blade 20 at rest, so as to avoid leading to bending moments that alternate from front to rear with rotary motion of the single-blade 20.

The counterweight 20d is placed at the end of the rigid portion 20c that is furthest from the rotor mast 10. It presents an aerodynamic state that is optimized both for transverse rotation while the rotor is turning and for translation when the rotor is stopped in its (head-on) position for cruising flight so as to minimize its aerodynamic resistance both in vertical flight and in horizontal flight.

The pitch of the active blade 20a may be constant and set at a positive angle of incidence that gives it good lift, or it may be controllable by a conventional system of rods, as in all helicopters. In the example of FIGS. 2a and 2b (only one single-blade 20), pitch control is preferably collective and cyclic.

Figure 3A:
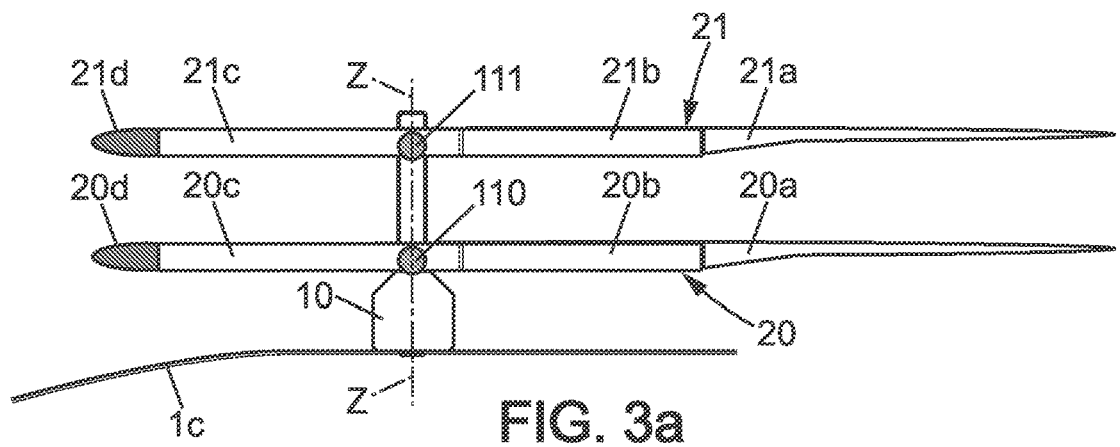
FIGS. 3a and 3b are views respectively analogous to FIGS. 2a and 2b of a second example of a rotor of the invention, having two single-blades contrarotating about a common axis of rotation.
Figure 3B:
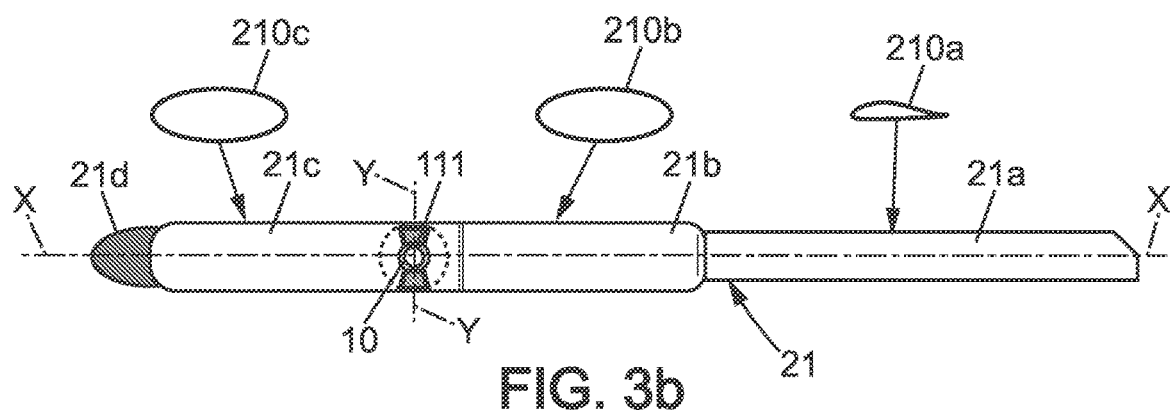

FIGS. 3a and 3b, which are respectively a side view and a plan view of another rotor, correspond respectively to FIGS. 2a and 2b, but in a rotor configuration having two contrarotating single-blades 20 and 21 that rotate about the same axis of rotation ZZ of the rotor mast 10. This is the preferred configuration of the invention, since it makes it possible to improve the figure of merit (FOM) of the rotor compared to a rotor having only one single-blade, and to do so without excessive mechanical complexity by eliminating cyclic pitch control, and finally it makes it possible to avoid any need for a tail rotor in order to balance driving torque. The two contrarotating single-blades 20 and 21 are substantially identical to each other and to the single-blade 20 of FIGS. 2a and 2b, with the sole difference being the orientation of the aerodynamic profiles 200a and 210a of the active portions 20a and 21a, which are oriented in opposite directions since they rotate in opposite directions, with their speeds of rotation being equal, but opposite.

In FIGS. 3a and 3b, a major difference relative to FIGS. 2a and 2b is that, in accordance with the invention, pitch control of the active blades 20a and 21a is collective pitch control only. The cyclic portion for controlling roll and pitching of the aerodyne is preferably provided by the attitude fans 4a, 4b, and 4c situated at the tips of the wings 1a and at the front end of the fuselage 1c. Specifically, the Applicants consider that introducing cyclic pitch control in such a contrarotating rotor would be extremely complex. In contrast, it is easy to envisage collective pitch control for such a rotor (see in FIG. 9 which shows one possible solution for collective pitch control).

Figure 4:
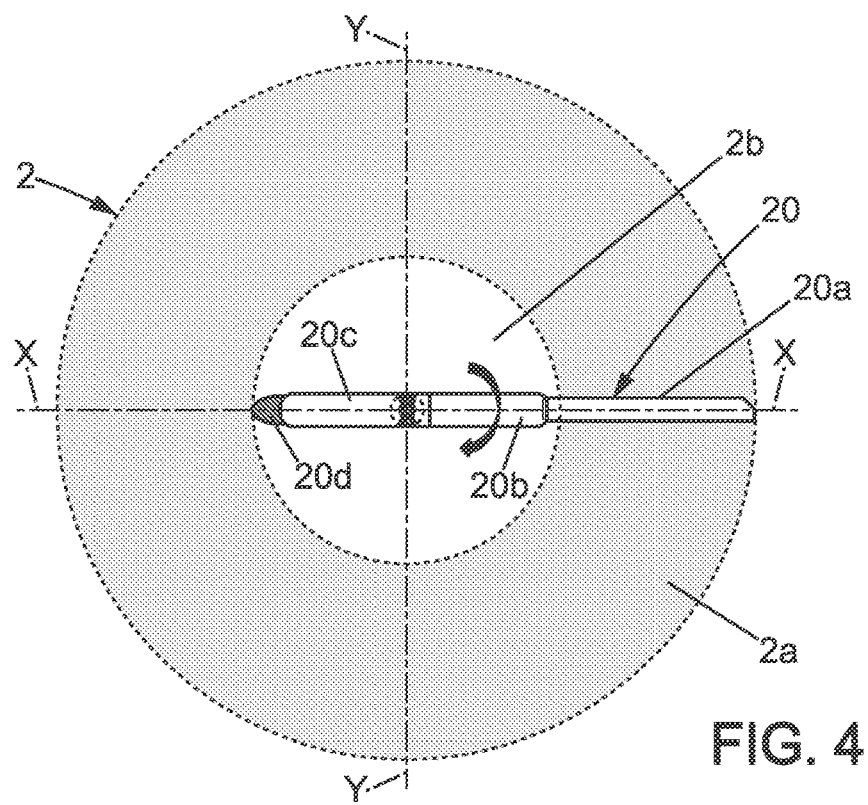
FIG. 4 is a diagrammatic plan view of the rotor of FIGS. 2a and 2b and of the corresponding rotor disk.

FIG. 4 is a plan view of the rotor of FIGS. 2a and 2b of the invention, in which there can be seen the zones that are swept by the single-blade 20 during its rotation. The area 2a (grayed in the figure) represents the zone swept by the "active" portion 20a of the single-blade. It constitutes a circular annulus at the periphery of the rotor disk 2, and thus in a portion where the forward speed of the active blade 20a is at its greatest, and thus where lift efficiencies are the best. The central area 2b of the rotor disk is inactive for lift and it may be observed that there is no longer a stagnation zone for this rotor architecture.

FIG. 5a is a diagram of a conventional two-bladed helicopter rotor with its central portion 20'b and blades 20'a, each of which is hinged at 110' to the radially outer end of the central portion 20'b that is secured to rotate with the rotor mast 10.

FIG. 5b is a diagram showing a rotor of the invention in accordance with FIGS. 2a and 2b having its active blade 20a and its attachment portion 20b hinged at 110 to the rotor mast 10 with the portion 20c carrying the counterweight 20d projecting from its other end. The diameters of the rotors are substantially equivalent, and the blades 20'a and the active blade 20a have a structure that is likewise substantially equivalent. It is well known that the blades 20'a of a helicopter rotor droop as a result of the blade 20'a bending while at rest, which droop may be considerable (several tens of centimeters at the tip of the blade). In the rotor of the invention, the fact of shortening the length of the active blade 20a so as to conserve only that portion of its length that is highly effective for lift, has a considerable effect on the static or dynamic bending of the active blade 20a. For example, reducing its length by one-third reduces its droop by more than 70%, other things remaining equal. This provision makes it possible to have an active blade 20a that is much more rigid, other things being equal. The stiffness of this active blade 20a is very useful for stabilizing the rotor during stages of stopping and restarting rotation of the rotor, and also in cruising flight at very high speed. This is a fundamental provision of the invention. Another very important aspect of the invention, which can be seen in FIGS. 5a and 5b, is the difference between the position of the blade hinge 110' of a conventional helicopter rotor (FIG. 5a) and the position of the hinge 110 in the mast 10 for the rotor of the invention (FIG. 5b). In the conventional situation of a helicopter, the length of the lever arm 20'b between the blade hinge 110' and the vertical axis of the rotor 10 plays a major role in the flight dynamics of the helicopter, in particular with respect to pitching and roll. In contrast, with a rotor of the invention as shown in FIGS. 2a and 2b, the hinge 110 of the single-blade 20 needs to be placed on the vertical axis of the rotor mast 10. The dynamics of the aerodyne in roll and pitching is managed by the stabilizers 4a to 4c of the type shown in FIG. 1.

FIGS. 6a, 6b, and 6c show the rotor of the invention with two contrarotating single-blades 20 and 21 having a common axis, shown respectively in plan view when stopped, e.g. during cruising flight, then in plan view when starting rotation of the single-blades 20 and 21, and then in front view during rotation of the single-blades 20 and 21. The main remarkable points of the invention that need to be emphasized in these figures are as follows:

- The single-blades 20 and 21 present "single-piece" structures, i.e. the rigid portions 20b and 20c for one blade, and 21b and 21c for the other, are continuous and hinged at 110 or 111 about parallel transverse axes YY that are offset from each other while being exactly on the vertical axis ZZ of the rotor mast 10.
- The hinges 110 and 111 are situated on the axis of rotation of the rotor, thus enabling the single-blades 20 and 21 to take up positions depending on the balance between lift forces and centrifugal forces. The positioning of the hinges 110 and 111 serves to avoid any interfering bending moments acting from front to rear on the rotor mast 10.
- Since the counterweights 20d and 21d are secured to the rigid portions 20c and 21c, their positions vary angularly in the same manner as the rigid portions 20c and 21c and the active blades 20a and 21b, and consequently centrifugal forces are constantly balanced.
- The stiffness of the hinges 110 and 111 is selected to be very low for positive angles (□) of the single-blades 20 and 21 (upward angles) and very high for zero or negative angles of the blades (downward angles).
- In addition, the rotor system of FIGS. 6a, 6b, and 6c has locking means for locking the single-blades 20 and 21 in position when they are stopped and extend towards the rear of the aerodyne (see FIGS. 11a to 13 in the cruising flight configuration).
- The pitch of the active blades 20a, 21a is preferably adjustable in collective manner (see FIG. 9), and there is no cyclic adjustment of the pitch of the active blades, of the kind that happens in most helicopters.

Nevertheless, in certain applications, it may suffice for the active blades 20a and 21a to have pitch that is constant, with the lift force of the rotor then being adjusted by modulating the speed of rotation of the single-blades 20 and 21. Under such circumstances, the pitch of each active blade 20a, 21a is constant and optimized for the maximum lift situation of the rotor when it is rotating at its nominal speed of rotation.

Figure 7A:
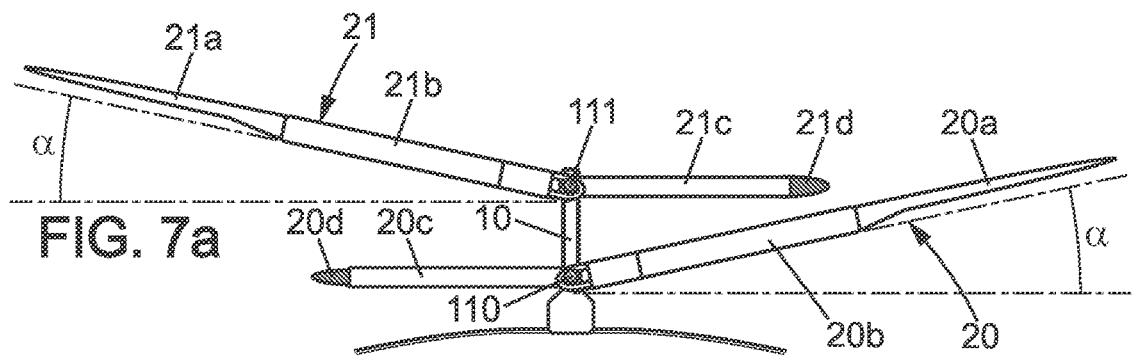
FIG. 7a is a view analogous to FIG. 6c of a second example of a rotor of the invention having two single-blades contrarotating about a common axis.

FIG. 7a shows a configuration that is a variant of FIGS. 6a to 6c, in which the rigid portions 20b and 20c, and also 21b and 21c, are not secured to each other. The rigid portions 20c and 21c, carrying the counterweights 20d and 21d, remain horizontal during rotation of the single-blades 20 and 21. This configuration presents the advantage of reducing the spacing between the two contrarotating single-blades 20 and 21 since the arms 20c and 21c carrying the counterweights 20d and 21d remain horizontal. This is useful in particular in the configuration shown in FIG. 14, described below, in which the counterweight 21d is placed at the end of a system 21e extending the rigid portion 21c, and thus correspondingly leading to considerable vertical movements since the counterweight 21d under such circumstances is far away from the axis of rotation of the rotor mast 10. Naturally, in FIG. 7a, the rigid portions 20b and 21b continue to be hinged to the rotor mast 10 at 110 and 111 so as to avoid creating interfering moments. Nevertheless, the fact that the rigid portions 20c and 21c carrying the counterweights 20d and 21d do not move angularly in the same manner as the active blades 20a and 21a together with the rigid portions 20b and 21b, leads to a small amount of unbalance when balancing centrifugal forces of the single-blades 20 and 21 and of the counterweights 20d and 21d. To obtain good balancing of centrifugal forces in this situation, the Applicants propose, by way of example, a balancing system that enables the counterweights 20d or 21d to be moved a little (a few centimeters) so that when the angle (□) of the corresponding active blades 20a or 21a increases, the counterweights 20d or 21d move a little closer to the rotor mast 10 in order to compensate for the reduction in the centrifugal forces of the active blade 20a or 21a together with its rigid carrier portion 20b or 21b. The counterweight 20d or 21d is initially placed in a mean equilibrium position for centrifugal forces, and the proposed balancing system subsequently moves in a little towards the axis of rotation of the rotor mast 10 when the angular amplitude (□) of the active blade 20a or 21a increases, and in the opposite direction when it decreases. An example of such a balancing system is shown in FIG. 7b for the single-blade 20:

The rigid portion 20b of the single-blade 20 is hinged about the hinge 110 that acts, e.g. via a planetary gear system 100a, to drive a disk or a pulley 101a having a cable 102a securely attached thereto, which cable is guided by guides 103a, 106a inside the rigid portion 20c to a shaft 104a, with the cable 102a being attached to the radially inner end of the shaft, which has its radially outer end (relative to the rotor mast 10) secured to the counterweight 20d. A spring 105a serves to hold the system continuously under tension, bearing at one end against an abutment secured to the shaft 104a and at the other end against a guide 106a held in the rigid part 20c.

The ratio of the planetary gear system 100a and the diameter of the pulley 101a are selected so that centrifugal forces are balanced for any cone angle □ of the active blade 20a.

Figure 7B:
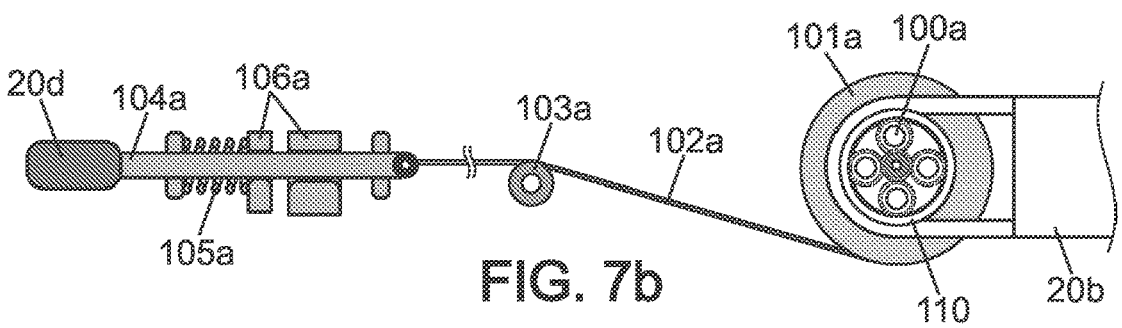

An alternative to FIG. 7b, which is not shown, would be to cause the position of the center of gravity of the active blade 20a to vary a little by moving it a little away from the rotor mast 10 when the cone angle □ increases, by using a device analogous to the device shown in FIG. 7b, but inverted.

Figure 8A:
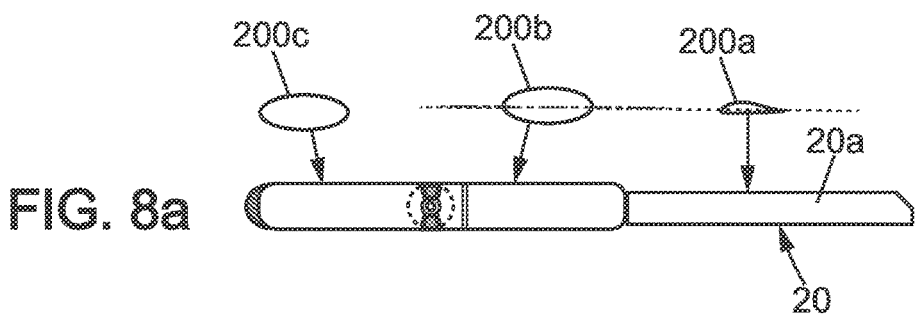
FIGS. 8a, 8b, and 8c are diagrammatic plan views (partially in section for FIG. 8c) showing a single-blade of a rotor of the invention with its device for driving the single-blade, a lead/lag damper, and a device for controlling the pitch of the corresponding active blade visible in FIG. 8c.
Figure 8B:
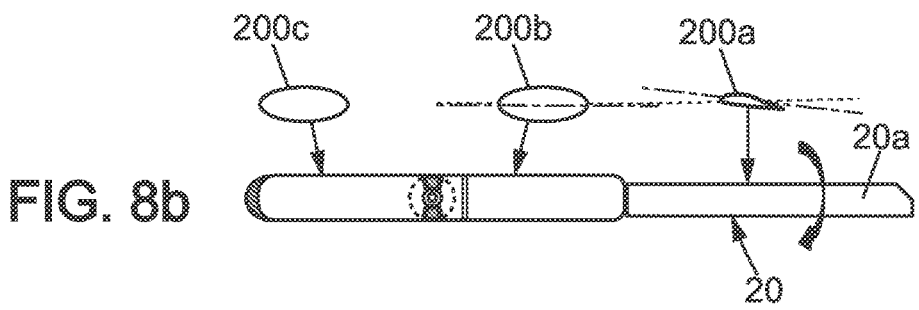
Figure 8C:
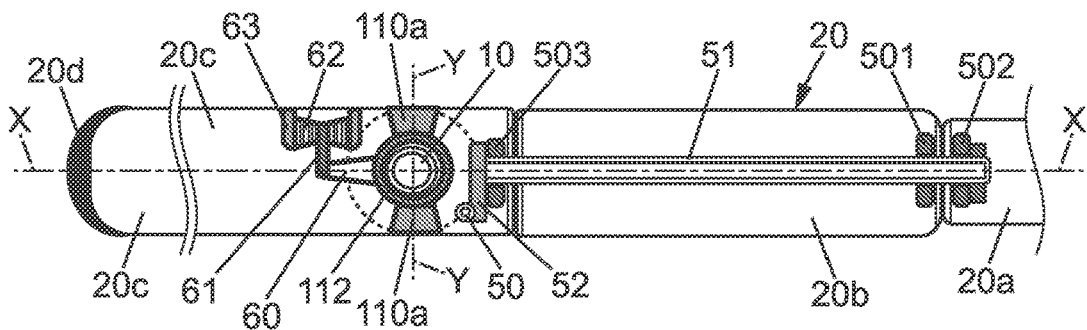

FIGS. 8a, 8b, and 8c show one possible architecture both for driving rotation of a single-blade such as 20 and for varying the pitch of its active portion 20a:

FIG. 8a shows the single-blade 20 at rest: the profile 200a of the active blade 20a is horizontal in order to minimize drag. This situation occurs for example during cruising flight or when starting rotation of the rotor in order to minimize the torque needed for setting it into rotation.

FIG. 8b shows the single-blade 20 while the rotor is rotating. The profile 200a of the active blade 20a has an angle of incidence relative to the horizontal plane, thus making it possible to generate a vertical lift force.

FIG. 8c shows both the means for driving the blade in rotation and the means for varying its angle of incidence:

Each single-blade such as 20 is hinged about a transverse axis YY that is horizontal and perpendicular to the vertical axis ZZ of the rotor mast 10 by two hinges 110a or 111a for the top single-blade 21 as appropriate) that are themselves fastened to a concentric part 112 of the rotor mast 10 so as to allow turning through small amplitudes about the axis of rotation Z in order to absorb drag fluctuations of the single-blade 20.

The single-blade 20 may advantageously be driven in rotation by an arm 60 secured to the rotor mast 10, with its extension 61 being embedded in a damped elastomer hinge/abutment system 62, 63 that serves simultaneously to drive the single-blade 20 in rotation and to damp fluctuations in lead/lag forces, that result in particular from fluctuations in lift forces from the active blade 20a as a function of its situation in flight.

The pitch of the active blade 20a is advantageously modified by means of a shaft 51 that passes lengthwise through the entire rigid portion 20b and that engages the root of the active blade 20a at its outer end (remote from the rotor mast 10) so as to be constrained therewith in turning about its own longitudinal axis, the assembly being held and mounted rotatably by abutments and bearings 501, 502, and 503 secured to the shaft 51 in order to withstand the centrifugal forces on the active blade 20a and in order to enable it to be turned. The rod abutment 50 is connected to the pitch control lever 52 that is secured to the inner end of the shaft 51 inside the end of the rigid portion 20c that is adjacent to the rigid portion 20b, and in which the shaft 51 passes through the bearing abutment 503, and serves to control the pitch of the active blade 20a with means that may for example be as shown in FIG. 9, described below.

Figure 9:
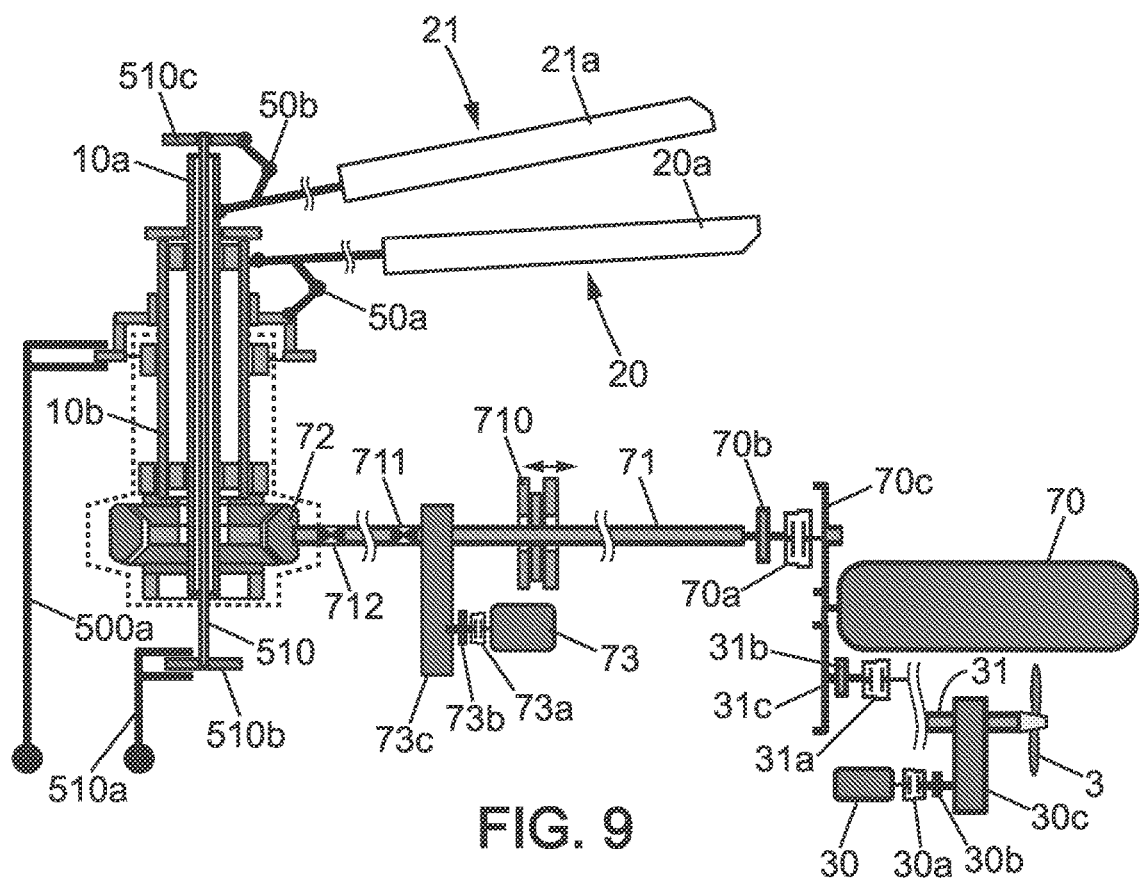
FIG. 9 is a highly diagrammatic view, partially in lateral elevation and partially in section on a plane containing the axis of the rotor mast, showing the drive train for driving a rotor having two single-blades contrarotating about a common axis and showing the system for driving, stopping, and restarting rotation of the two contrarotating blades, the system for controlling the common pitch of their active blades, and also the system for driving a pusher or puller propeller of the aerodyne.

FIG. 9 shows both the drive train for driving the single-blades 20 and 21 in rotation and also for driving the pusher propeller 3 of the aerodyne, and it also shows the linkage for controlling the collective pitch of the active blades 20a and 21a:

Driving the single-blades 20 and 21 in rotation. In FIG. 9, the Applicants show one possible architecture for driving the rotor during stages of vertical flight, together with appropriate devices for braking the rotor and positioning it safely during cruising flight and enabling rotation to be restarted during the opposite transition from cruising flight to vertical flight. The rotor mast is made up of two coaxial shafts 10a and 10b that rotate in opposite directions so that each of them drives a respective one of the two single-blades 20 and 21 in contrarotation. The shafts 10a and 10b are driven by the transmission gearbox 72, itself driven by a drive shaft 71. Advantageously, the drive shaft 71 presents two cardan type hinges 711 and 712 along its length so as to make it possible, where appropriate, to tilt the rotor assembly from front to rear through a few degrees (2°-3°). During a stage of hovering flight or semi-hovering flight (horizontal flight with lift provided by the rotor), the rotor mast is driven by a main engine 70 (a two- or four-stroke piston engine, a gas turbine, . . . ) provided with a clutch 70a, an overrunning clutch or "freewheel" 70b, and a transmission gearbox 70c. During the stage of stopping the rotor (transition from vertical flight to horizontal flight), the rotor 70 is stopped and declutched, leaving the rotor to continue turning freely, with the pitch of the active blades 20a and 21a being set to zero, with rotation being braked by a brake 710, and then the single-blades 20 and 21 are moved into a cruising flight position by an electric motor 73 that also has its own clutch 73a, its own freewheel 73b, and its own transmission belt 73c. In the inverse situation, during the transition from cruising flight to vertical flight, the pitch of the active blades 20a and 21a is kept at zero, the brake 710 is released, and the electric motor 73 drives rotation of the rotor up to a speed that is sufficient to enable the main engine (70) to be engaged to drive the rotor with the active blades 20a and 21a progressively taking on pitch. Finally, in order to accelerate putting the rotor into rotation at the end of a stage of horizontal flight, it is possible either to tilt the rotor very little (2° to 3°) like a gyrodyne as made possible by the above-described cardan hinges 711 and 712, or else, and preferably, to take advantage of the rigid portions such as 20b and 20c having an asymmetrical profile as described below with reference to FIG. 10, to cause the single-blades 20 and 21 to be set into rotation naturally by the relative airflow (windmill effect).

Driving the pusher propeller 3. The pusher or puller propeller 3 is driven during cruising flight by a transmission system 31c, clutches 31a, 30a, freewheels 31b, 30b, and a transmission shaft 31 substantially parallel to the shaft 71 that drives the rotor during a stage of vertical flight. Advantageously, the Applicants propose that the pusher propeller 3 should also be driven by a low power motor 30 that is declutchable (using the clutch 30a and the freewheel 30b), e.g. a motor having power equal to 10% of the power of the main engine 70, thus providing the following advantages:

During a stage of pure vertical flight, the propeller 3 is not driven by the main engine 70, it is declutched via the clutch 31a. The auxiliary motor 30 is idling and drives the propeller 3 having its pitch set to zero so as to avoid generating any propulsive force.

During a stage of transitioning from vertical flight to horizontal cruising flight, the pitch of the propeller 3 is increased progressively, with the auxiliary motor 30 operating at full speed.

Thereafter, the main engine 70 is clutched at 31a, while the rotor is disconnected by the clutch 70a, and the auxiliary motor 30 may remain connected or may be disconnected.

The power from the main engine 70 is transmitted in full to the propeller 3 in order to propel the aerodyne in cruising flight.

The inverse transition from horizontal cruising flight to vertical flight is performed in the opposite manner.

The very great advantages of this architecture are as follows:

The propeller 3 is started and stopped independently of the main power plant, and thus under conditions that are easily controlled.

In the event of a malfunction of the main engine 70, the aerodyne can land by "airplane" flight while using the auxiliary motor 30.

This avoids any need to duplicate the main power plant as required by most regulations concerning vertical flight.

In the event of a malfunction of the auxiliary motor 30, the aerodyne can land by flying vertically using its main engine 70.

Adjusting the collective pitch of the active blades 20a and 21a: the Applicants show one possibility (other possibilities also exist) in FIG. 9 for an architecture for controlling the pitch of the active blades 20a and 21a. The pitch of the active blades is controlled collectively by the rods 50a, 50b (see also FIG. 8c). The positions of the rods 50a, 50b are controlled by collective swashplates 500a, 510a, 510b, and 510c, which move vertically parallel to the axis of rotation, with movements that are synchronized so that the pitches of the active blades 20a and 21a are exactly the same.

Figure 10:
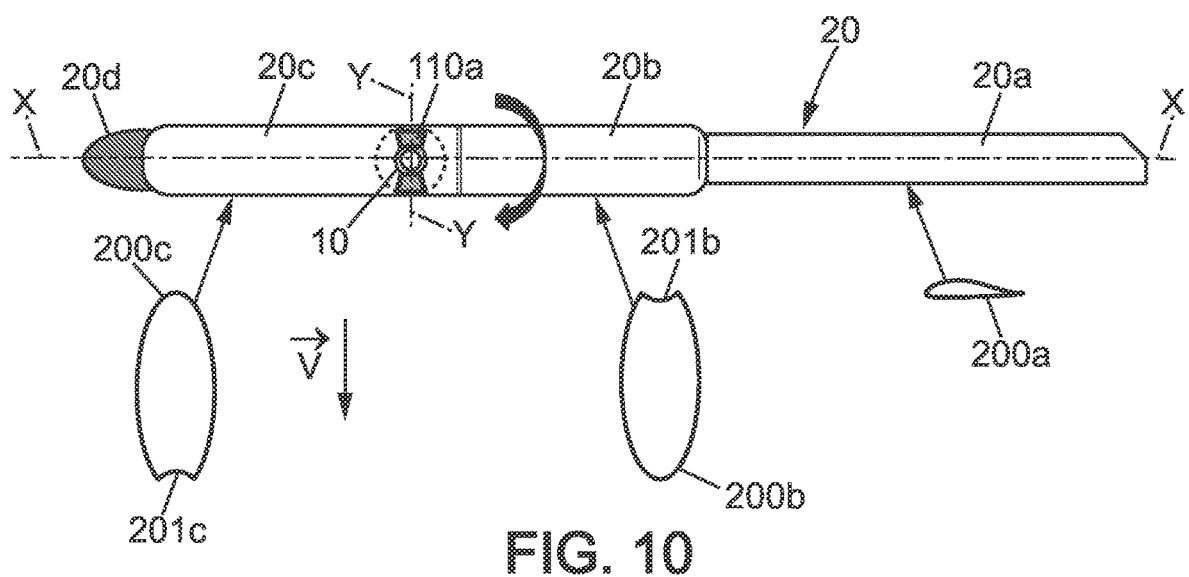
FIG. 10 is a diagrammatic plan view analogous to FIG. 2b showing another example of a single-blade of a rotor of the invention, having an airfoil adapted to facilitate setting the rotor into rotation during a transition stage between cruising flight and vertical flight.

FIG. 10 shows an architecture that is particularly advantageous for the rigid portions 20b and 20c that carry the active blade 20a at one end and the counterweight 20d at the other end. The single-blade 20 is shown by way of example in the situation for setting the rotor into rotation at the end of a stage of horizontal cruising flight (speed V, rotation of the single-blade 20 in the clockwise direction) and in transition to vertical flight. The advantageous feature claimed by the Applicants is that the profiles 200b and 200c of the respective rigid portions 20b and 20c, which are generally oval or elliptical in shape so as to provide minimum drag in rotation, include "recessed" shapes 201b or 201c in their trailing edges, thereby creating considerable asymmetry between the drag of a profile in one direction and the drag of the other profile in the opposite direction. For example, with the single-blade 20 as shown in FIG. 10, with the speed V oriented in the direction shown in FIG. 10, and with the rotation of the rotor in the clockwise direction as shown in FIG. 10, the drag of the rigid portion 20b is very low while the drag of the portion 20c is greater given its recessed shape 201c. Thus, when restarting the rotor and after disengaging the brake 710, and starting rotation by means of the electric motor 73 (see FIG. 9), the relative airflow exerts rotary torque on the system as a whole, which torque is associated with the asymmetry of the profiles 200b and 200c, thereby serving to accelerate putting the rotor into rotation.

During cruising flight at high speed, it is possible to lock the rotor in a rigid position. For this purpose, the Applicants advantageously propose adding mechanical locking systems to the already-mentioned braking and locking systems on the rotor axis. One of these systems is shown in profile view, in front view, and in plan view in FIGS. 11a, 11b, and 11c respectively; another system, that may be used additionally or as an alternative, is described below with reference to FIG. 13.

Once the rotor is positioned in its cruising flight configuration by the above-described systems, and before the speed of the aerodyne is too great, it is preferable to lock the rotor mechanically in position. This may be done by using a locking device 80 that remains masked in position A (FIG. 11*a*) in housings 81*a* and 81*b* for locking devices 80*a* and 80*b* in the body or fuselage of the aerodyne 1 (see FIG. 11*b*), while the rotor is rotating, and then at the beginning of cruising flight they move to lock the rotor on either side of the rigid portions 20*b* and 21*b* of the single-blades 20 and 21 (position B in FIG. 11*a*), coming to bear via recessed notches 811*a* and 811*b* provided for this purpose against projecting portions 800*a*, 800*b* and 810*a*, 810*b* on either side of the rigid portions 20*b*, 21*b*.

The rotor is thus locked mechanically and securely during cruising flight. Even at high speed, vibratory instability is controlled since the active blades 20*a*, 21*a* are of short length which gives them good stiffness.

Figure 12A:
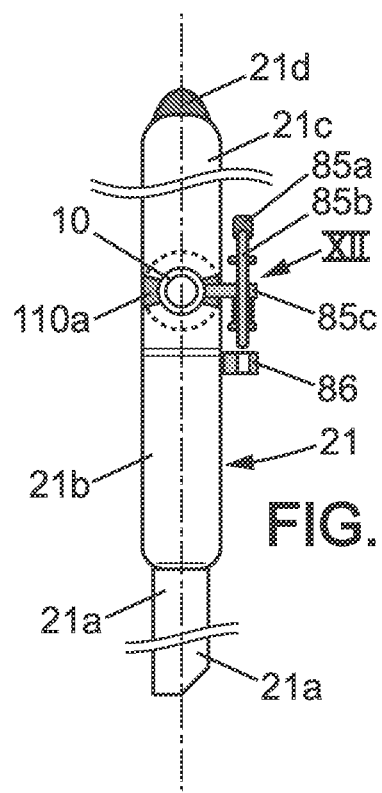
FIGS. 12a and 12b are respectively a fragmentary diagrammatic plan view and a detail diagrammatic view of an example of a mechanical device for locking a single-blade in a "horizontal" or rest position when the rotor is stopped, which device is released when the rotor is in rotation.
Figure 12B:
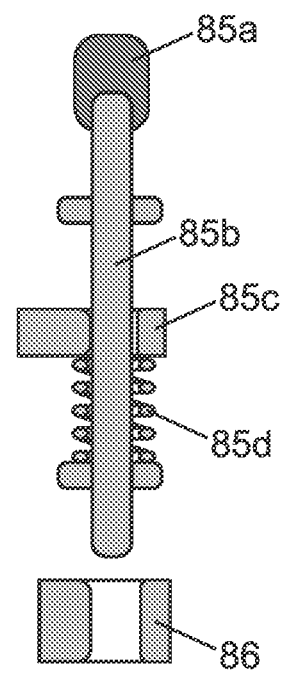

FIG. 12*a* is an overall view and FIG. 12*b* is a detail view (XII in FIG. 12*a*) of a device for locking a single-blade such as 21 at the rotor mast 10 during cruising flight. In order to simplify the drawing, the device is shown outside the single-blade 21, however in reality it is preferably integrated inside the rigid portions 21*b*, 21*c* of the single-blade 21 for better aerodynamics. The principle of this system is that a device for blocking the single-blade 21 in the horizontal position locks the single-blade horizontally when it is not rotating, and releases it when the rotor is to start turning. The locking device, which is fastened to the vertical shaft of the rotor mast by means of a guide 85*c*, comprises a sliding bolt 85*b* having an end flyweight 85*a* that, under the effect of centrifugal force, and against the action of a return spring 85*d* acting on the bolt 85*b*, serves to release the bolt 85*b* from its locking housing 86 that is secured to the rigid portion 21*b* of the single-blade 21. The single-blade 21 can then flap normally as a function of fluctuations of lift. Conversely, when the rotor stops and the single-blade 21 returns to the horizontal position, the locking device returns to lock the single-blade 21 in the horizontal position, by means of the spring 85*d* pushing the bolt 85*b* into the housing 86.

Figure 11A:
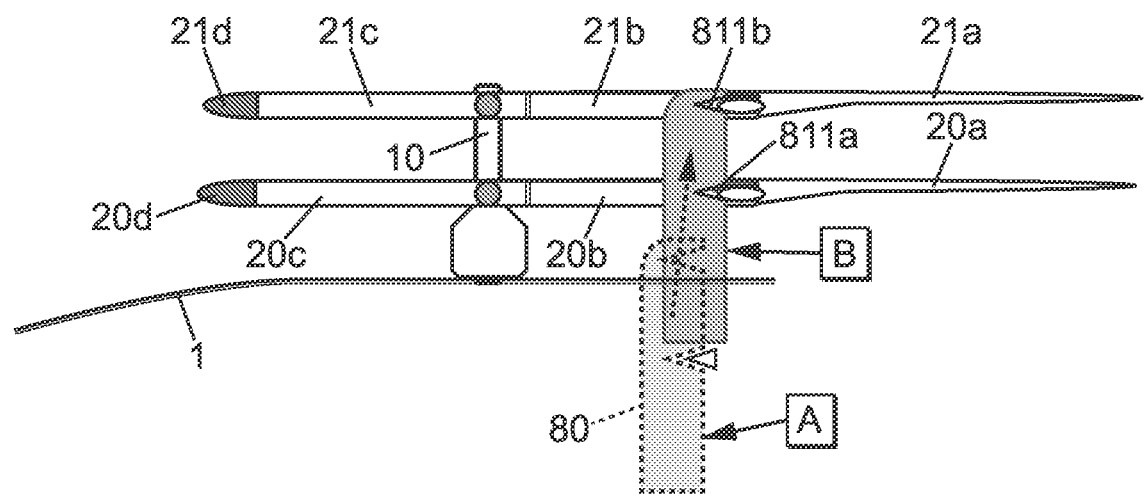
FIGS. 11a, 11b, and 11c are diagrammatic views, respectively a profile view, a face view, and a plan view, of a rotor having two single-blades of the invention with its system for mechanical locking during cruising flight.
Figure 11B:
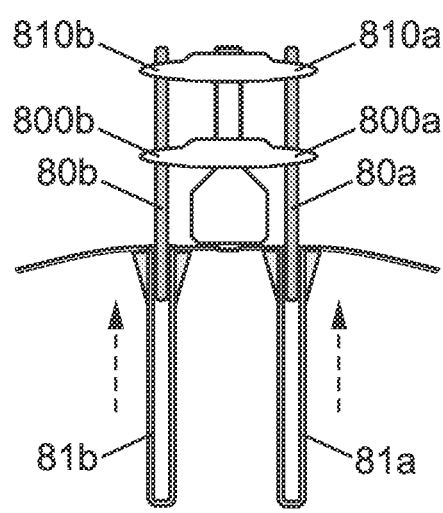
Figure 11C:
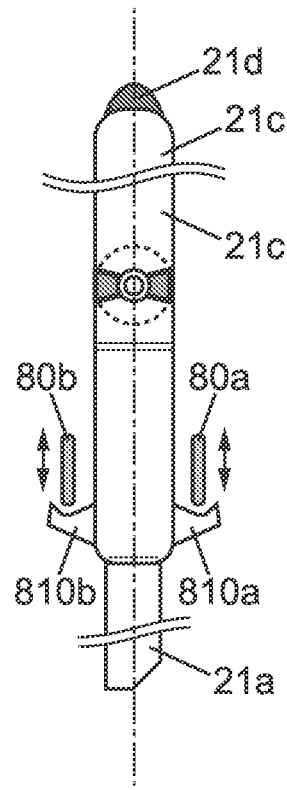
Figure 13:
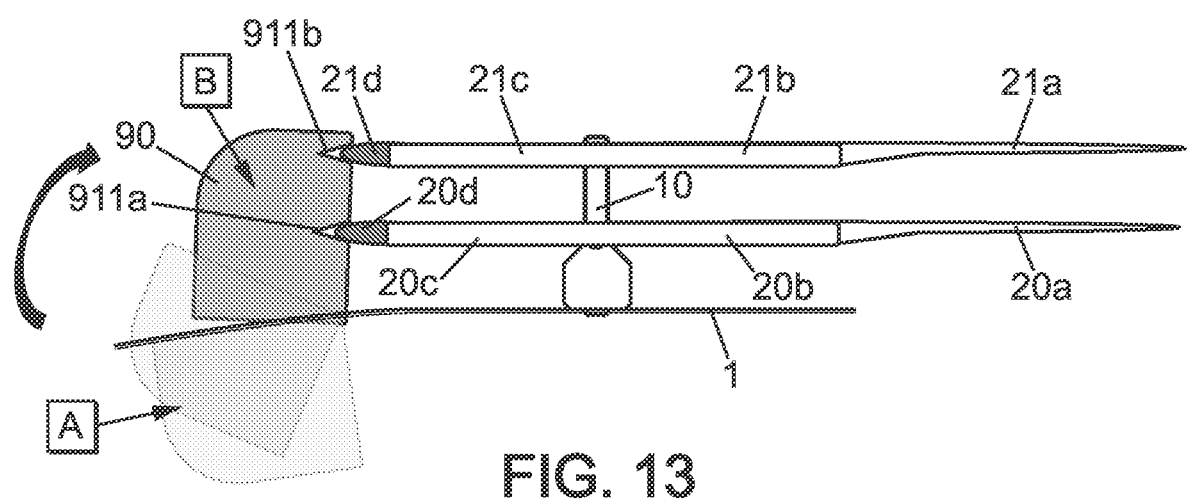
FIG. 13 is a diagrammatic lateral elevation view of a rotor of the invention having two single-blades contrarotating about a common axis, showing a mechanical locking device that can be used as an alternative to or together with the device of FIGS. 11a, 11b, and 11c in order to lock the rotor during cruising flight.

FIG. 13 shows an alternative to the locking system of FIGS. 11*a* to 11*c*. In this option, the locking panel(s) 90 is/are masked during rotation of the rotor in a position A inside the body of the aerodyne 1. After the rotor has stopped, the panel(s) 90 is/are raised so as to bear via notches or housings 911*a*, 911*b* provided for this purpose against the front end(s) of the single-blades 20 and 21, i.e. against the counterweights 20*d*, 21*d*. In this way, in addition to the fastenings at the rotor mast 10 as shown in FIGS. 12*a* and 12*b*, the rotor is securely locked to a rigid portion that can hold the rotor in the horizontal position throughout cruising flight at high speed. Naturally, the locking panels 90 are streamlined so as to offer minimum aerodynamic resistance during cruising flight.

Figure 14:
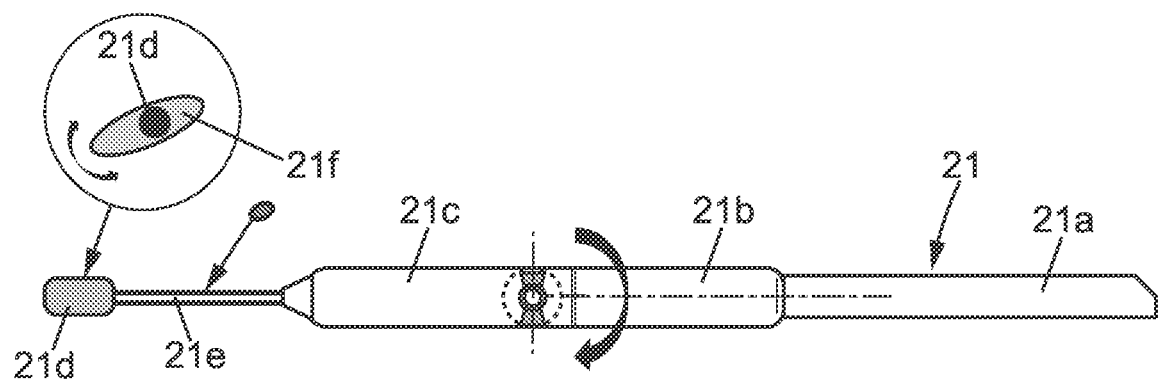
FIG. 14 is a diagrammatic plan view of another example of a single-blade of a rotor of the invention with an extender carrying the counterweight, the counterweight having a shape and an orientation that are adapted to reduce drag and avoid disturbing the air stream during vertical flight.

FIG. 14 shows, by way of example on the single-blade 21, the possibility of having a counterweight 21*d* in an offset position, i.e. further away from the axis of rotation of the rotor. The counterweight 21*d* is fastened to the end of a rigid rod 21*e* that extends the rigid portion 21*c* and that is of small diameter in order to minimize drag forces during rotation of the rotor. Advantageously, the counterweight 21*d* is of oblong streamlined shape oriented to match the mean speed of the air stream seen by the rotor. The rod 21*e* may have a section that is circular or oblong, being oriented like the counterweight 21*d*. Under such conditions, the drag generated by the counterweight 21*d* is small. In order to further reduce the drag of the counterweight 21*d*, it is possible advantageously to enclose it in an oblong minimum-drag shape 21*f* that is carried by the rod 21*e* and that can take up an orientation that matches exactly the direction of the air stream during rotation of the rotor, with this being made possible by a resilient hinge. The advantage of the configuration of FIG. 14 is to minimize the weight of the counterweight 21*d* by spacing it further away from the axis of rotation of the rotor. The disadvantages are firstly a small disturbance to the air stream generated by the rotor, and above all greater geometrical interference, in particular for a rotor having two contrarotating single-blades rotating about a common axis such as the blades 20 and 21, since this makes it necessary to increase the vertical spacing between the two single-blades. In contrast, the configuration of FIG. 14 is particularly well adapted to the situation shown in FIG. 7 in which the counterweights 20*d* or 21*d* remain horizontal.

Figure 15A:
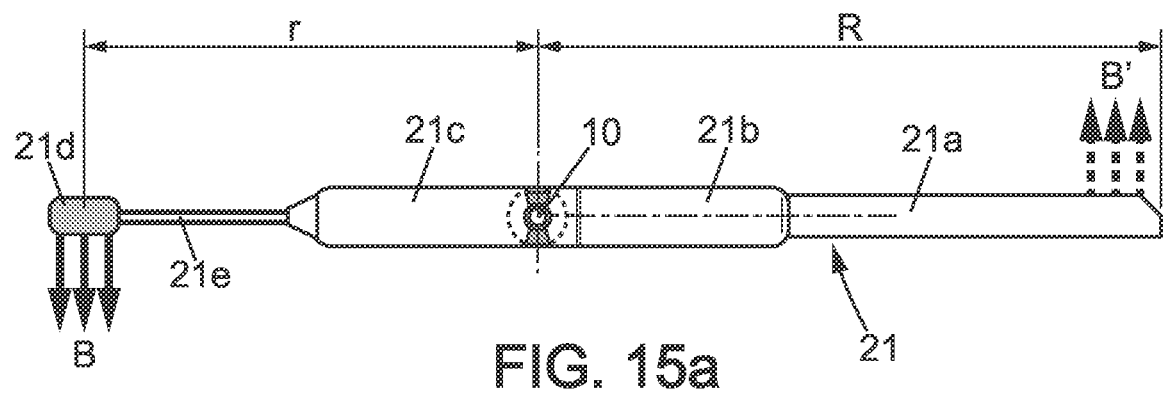
FIGS. 15a and 15b are respectively diagrammatic plan and lateral elevation views of yet another example of a single-blade for a rotor of the invention, fitted with a system for driving the rotor by generating compressed air and expelling the compressed air from the counterweight carried by an extender of the kind shown in FIG. 14, possibly with compressed air also being expelled from the tip of the active blade.
Figure 15B:
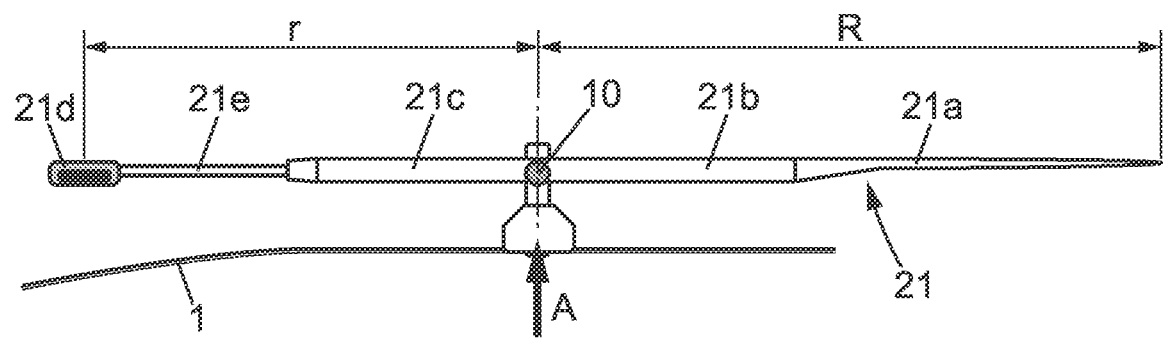

FIGS. 15*a* and 15*b* are respectively a plan view and a lateral elevation view showing the possibility of driving a single-blade such as 21 as shown in FIG. 14 in a rotor of the invention by using a stream of compressed air that may be taken either from the compression stages of a gas turbine, or that comes from a compressor driven by an engine, which air is subsequently "ejected" from the periphery of the rotor after the compressed air stream has traveled along pipework, hoses, and rotary sealing joints along the rotor mast 10 and then along the single-blade 21. This is a known technique for driving a rotor, with certain helicopters using this technique (e.g. Djinn). The advantage is that this drive system does not create torque on the structure of the aerodyne, and therefore does not need a tail or anti-torque rotor. The particular feature in the invention is that the (driving) propulsive force resulting from ejecting the air stream B is preferably delivered via the counterweight 21*d* carried by a tubular extender arm 21*e* that extends the rigid portion 21*c*. In this way, there is very little interference with the aerodynamic performance of the active blade 21*a*, and the exact position of the jet B can be optimized to minimize the power absorbed by the compressed air (minimizing the air flowrate). The Applicants have thus determined that an optimum ratio r/R (see FIGS. 15*a* and 15*b*) for the mean radius r of the air jet over the radius R of the rotor lies in the range 55% to 85%. The air stream taken from the compressor reaches A in the rotor mast 10 and leaves the counterweight 21*d* at B (it being possible also to eject a fraction of the air via the end of the active blade 21*a* at B', however this possibility appears to provide lower performance), thereby generating a force that serves to drive the rotor. Naturally, FIGS. 15*a* and 15*b* show the application of this system to a rotor having one single-blade, however it could also be applied to a rotor having two contrarotating single-blades on a common axis, as shown in FIGS. 3*a* and 3*b*.

Figure 16A:
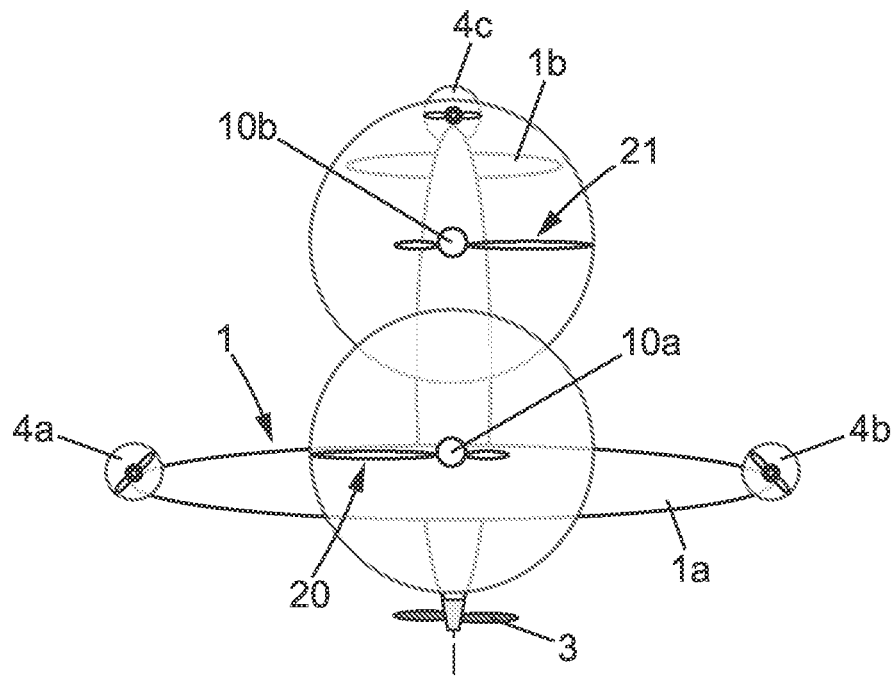
FIGS. 16a and 16b are views analogous respectively to FIGS. 1a and 1b for another example of an aerodyne of the invention fitted with a rotor system having two contrarotating single-blades, each being driven about a respective one of two axes of rotation that are spaced apart along the roll axis of the aerodyne.
Figure 16B:
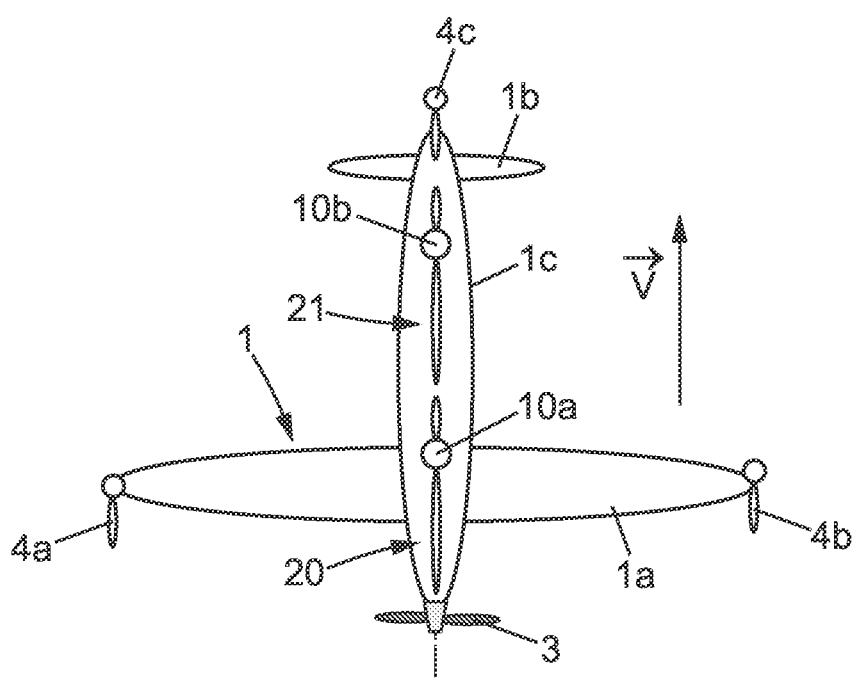

FIGS. 16*a* and 16*b* are diagrams showing a variant of the aerodyne of FIGS. 1*a* and 1*b* respectively in hovering or vertical flight and in horizontal or cruising flight, this variant comprising an aerodyne 1, like that of FIGS. 1*a* and 1*b*, with a fixed wing constituted by two rear wings 1*a* and a canard wing 1*b* at the front, the fixed wing being supported by the fuselage 1*c* that also supports the rotor 2 for providing lift in vertical flight, and for which rotation is stopped at the end of the stage of transitioning from vertical flight to high speed horizontal cruising flight. In the example of FIGS. 1*a* and 1*b*, the rotor 2 is shown diagrammatically as being constituted by a rotor having two contrarotating single-blades 20 and 21 that rotate about a single rotor axis of rotation, i.e. the axis of the rotor mast 10. Naturally, in FIGS. 1*a* and 1*b*, the rotor 2 could comprise only one single-blade such as 20 or 21. In horizontal cruising flight, the single-blade(s) 20 and/or 21 is/are aligned in the direction of the roll axis of the aerodyne 1, such that the active blades are directed towards the rear and the counterweight towards the front, relative to the travel direction of the aerodyne at the speed. In the advantageous variant application for single-blades of the invention to constituting a vertical flight lift rotor that is suitable for being stopped in horizontal or cruising flight, FIGS. 16a and 16b show an aerodyne having a rotor system comprising two rotors, each of which is constituted by one single-blade of the invention. For example, as shown in FIGS. 16a and 16b, there is one single-blade 20 driven in rotation by a rotor mast 10a level substantially with the leading edges of the rear wings 1a, thereby constituting a rear rotor, and another single-blade 21 driven in rotation by another rotor mast 10b over the front portion of the fuselage 1c, behind the canard wing 1b, thereby constituting a second rotor, the single-blades 20 and 21 being contrarotating, but in this example each of them is driven in rotation about a respective one of the two axes of rotation, which axes are offset from each other along the roll axis of the aerodyne 1. In cruising flight (FIG. 16b), each of the single-blades 20 and 21 is oriented longitudinally towards the rear of the aerodyne 1, i.e. towards the pusher propeller 3, and only the counterweights and the rigid portions that support them being directed towards the front of the respective rotor mast 10a or 10b.

In the example of FIGS. 16a and 16b, the single-blades 20 and 21 rotate in opposite directions with the same angular pitch, thereby eliminating any need for a tail rotor in order to balance the drive torque, since the torques are opposite and of the same amplitude. Insofar as the contrarotating single-blades 20 and 21 are no longer superposed, as they are in the embodiments of FIGS. 1a and 1b, the adjustment of the pitch of the active blades of these single-blades may be of three types:

fixed pitch with no pitch adjustment: and using stabilizers 4a, 4b, and 4c at the tips of the wings 1a and at one end of the fuselage 1c;

collective pitch adjustment only: and using stabilizers 4a, 4b, and 4c, as above; and both collective and cyclic pitch adjustment: with or without using stabilizers 4a, 4b, and 4c, as described above.

It is important to observe that FIGS. 16a and 16b show an aerodyne with a rotor system having two single-blade rotors that are offset along the roll axis of the aerodyne and that are aligned in cruising flight, however it is possible to install a configuration having 2n rotors, where n is greater than or equal to 1.

On the aerodynes 1 of FIGS. 1a and 1b, and also of FIGS. 16a and 16b, the stabilizer systems 4a and 4b at the wing tips and the stabilizer systems 4c at the (front) end of the fuselage 1c may be made in the same manner as for the main rotor or rotor system, that provides lift in vertical flight. Consequently, the stabilizer systems 4a, 4b, 4c may be in the form of stabilizer rotors each having at least one single-blade hinged like the main rotor or rotor system for providing lift in vertical flight, i.e. only one single-blade, or two contrarotating single-blades rotating about a common axis, which blades are stopped and stored in a position of minimum aerodynamic position during cruising flight.

Thus, the stabilizer systems 4a, 4b, and 4c at the tips of the wings 1b and/or at the end of the fuselage 1c, for controlling the roll and pitching movements of the aerodyne 1 may be made in the same manner as the main rotor or rotor system for providing lift in vertical flight, but on a smaller scale, corresponding to the functions performed by said stabilizer systems 4a, 4b, 4c, each having at least one single-blade, such as 20 or 21 with a counterweight 20d or 21d.

The diagrammatic representation of the stabilizer systems 4a, 4b, and 4c in FIGS. 1a, 1b, 16a, and 16b corresponds to an embodiment using two contrarotating single-blades rotating about a common axis, in which the two single-blades in the cruising flight position (FIG. 1b and FIG. 16b) are superposed and aligned towards the rear of the aerodyne, parallel to its longitudinal axis. For such stabilizer systems 4a, 4b, and 4c, rotary drive by electric motors is a preferred solution. It makes it possible to avoid mechanical transmission lines from at least one of the engines of the aerodyne in order to drive rotation of the lift rotor or rotor system and also of at least one pusher or puller propeller, thereby providing a solution of smaller weight.

Figure 17A:
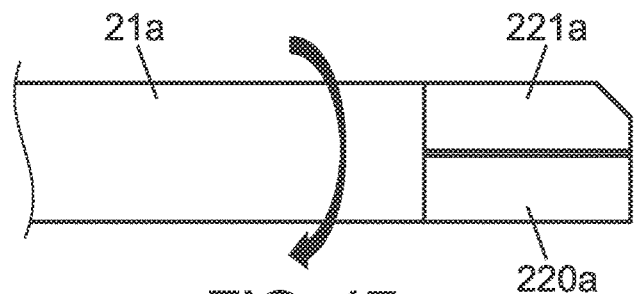
FIGS. 17a, 17b, 17c, and 17d are respectively diagrammatic plan views and diagrammatic cross-section views, both when the single-blade of the rotor is rotating and also when its drive is stopped, showing an active end-of-blade device corresponding to the rotor of the invention and such that when the single-blade is no longer driven in rotation it automatically becomes aligned substantially in the direction of the roll axis of the aerodyne, in the direction opposite to the travel direction of the aerodyne.
Figure 17B:
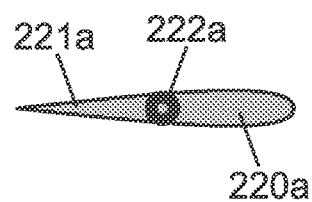
Figure 17C:
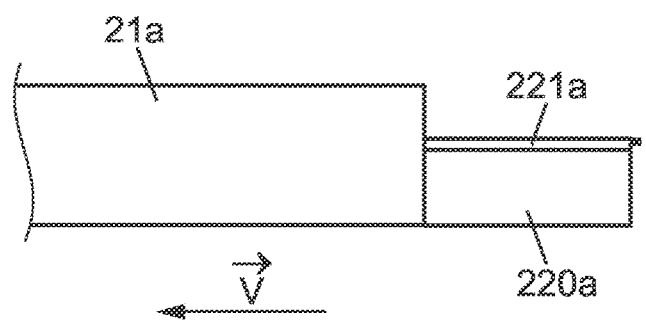
Figure 17D:
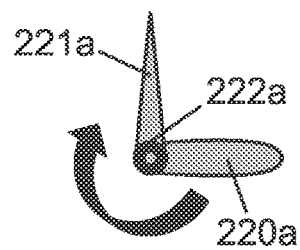

FIGS. 17a, 17b, 17c, and 17d show an architecture for the tip of an active blade such as 21a that enables the corresponding single-blade 21 to come back into alignment with the longitudinal or roll axis of the aerodyne, when the rotor is stopped. Specifically, at its free end, the active blade 21a has two adjacent portions 220a and 221a, one of which, 220a, extends the leading edge, and the other one of which, 221a, extends the trailing edge of the active blade 21a, which portions are hinged to each other about a longitudinal axis 222a that is substantially halfway along the chord of the profile of the active blade 21a. The rest position of the rear portion 221a is vertical, as shown in FIG. 17c. During rotation (FIG. 17a), the rear portion 221a is folded down by the air stream or relative airflow so as to extend the front portion 220a, and it is blocked in this position by a blocking device that is sensitive to centrifugal force, the device being of the type described above with reference to FIG. 12 (and not shown in any of FIGS. 17a to 17d in order to avoid overcrowding the drawings). When the rotor stops, the blocking device releases and the rear portion 221a becomes vertical, e.g. as a result of the action of a return spring (also not shown), and it acts substantially as a tail fin for bringing the single-blade 21 onto the longitudinal axis of the aerodyne, with the active blade 21a towards the rear and the corresponding counterweight 21d towards the front of the aerodyne.

Figure 18:
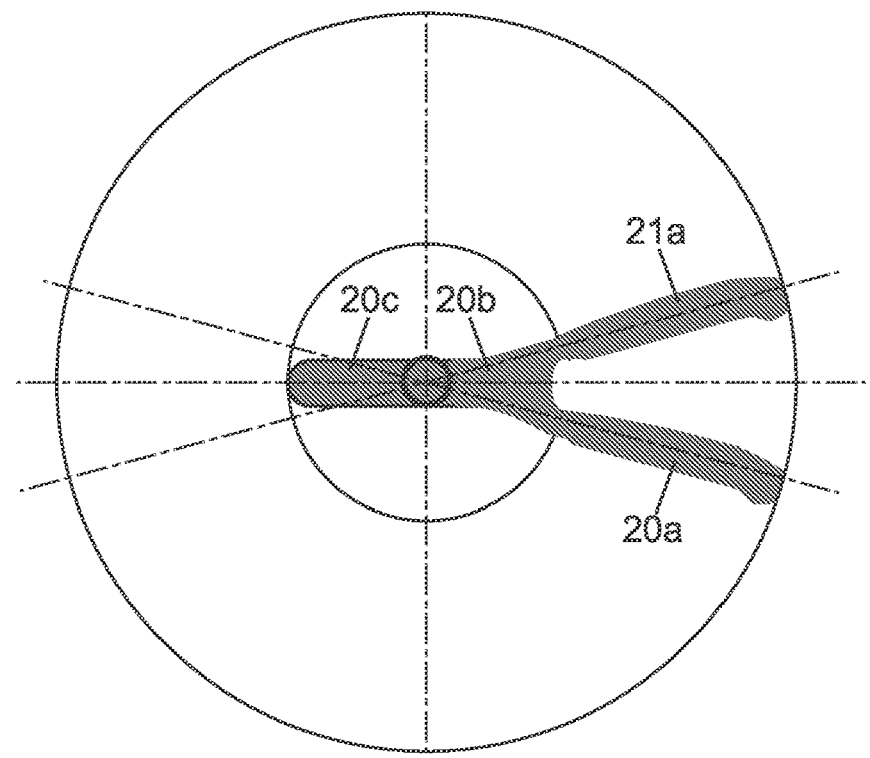
FIG. 18 is a diagrammatic plan view of yet another example of a rotor of the invention with a single-blade having two active blades in a V-configuration.

FIG. 18 shows another possible variant of a single-blade rotor, in which the active blade is duplicated at 20a and 20b in order to increase the "solidity" of the rotor, i.e. the ratio between the area of the blade and the area swept by the blades. The single-blade has a single rigid portion 20b (attached to the rotor mast) that is secured to the roots of the two active blades 20a and 21a, which are spaced apart from each other in a V-shape lying substantially in the plane of the corresponding rotor disk, and preferably at an angle of not less than 30°, with the counterweight at the end of the rigid portion 20c supporting it being dimensioned accordingly.

The invention claimed is:

1. A rotor for a hybrid aerodyne having a fuselage with a roll axis and provided with a fixed wing and a rotary wing configured for being held stationary in cruising flight of the aerodyne, the rotor having a radius R and configured for producing lift by rotating around a mast axis during a stage of vertical flight and for being held stationary and stored longitudinally during a stage of cruising flight, the rotor comprising at least one single-blade with a counterweight being rotatable around a rotor axis, said at least one single-blade comprising:

an active blade that generates the lift of the rotor during rotation;

a first portion that carries said active blade and that constitutes a connection between the active blade and a rotor mast; and a second portion that carries said counterweight and that constitutes a connection between the counterweight and said rotor mast, said active blade having a length along its span direction which is less than said radius R of the rotor;

said first portion carrying the active blade being a portion that is structurally rigid;

said first portion having a cross-section of aerodynamic profile providing zero or almost zero lift when the rotor is in rotation;

said first portion and said active blade being constituted as an assembly;

wherein said assembly having a common longitudinal axis, is hinged about a transverse axis perpendicular to the mast axis, and to the common longitudinal axis, the transverse axis crossing the mast axis;

wherein the rotor comprises at least two of the at least one single-blade that are identical and rotate in opposite directions, each single-blade rotating about a respective one of axes of rotation that are longitudinally spaced apart along the roll axis of the fuselage; and wherein during cruising flight, each single-blade is stopped and locked longitudinally and horizontally, and the at least two of the single-blades are aligned along an axis parallel to the roll axis of said fuselage and that the counterweight of each single blade is oriented towards the front of the aerodyne and the active blade is oriented towards the rear of the aerodyne, substantially in the direction of the roll axis of the aerodyne, and that, during vertical flight, the at least two of the single-blades rotate in opposite directions at the same angular speed from an initial zero position, which is said longitudinally and horizontally stopped position.

2. The rotor according to claim 1, wherein the length of the active blade along its longitudinal axis lies in the range 50% to 70% of the radius R.

3. The rotor according to claim 1, wherein said second portion carrying the counterweight is substantially analogous to the first portion carrying the active blade in that it is structurally rigid and of cross-section of aerodynamic profile providing zero or almost zero lift when the rotor is in rotation.

4. The rotor according to claim 3, wherein a length of the second portion carrying the counterweight along the common longitudinal axis is substantially equal to a length of the first portion carrying the active blade.

5. The rotor according to claim 1, wherein the second portion carrying the counterweight and the first portion carrying the active blade form a single continuous and rigid structure pivotally hinged about said transverse axis at said axis of rotation of the rotor.

6. The rotor according to claim 1, wherein the second portion carrying the counterweight is driven in rotation like the first portion carrying the active blade, but remains constantly perpendicular to the axis of rotation of the rotor during all stages of flight of the aerodyne.

7. The rotor according to claim 6, wherein the counterweight conserves a degree of freedom to move longitudinally under the control of a balancing device in proportion to a cone angle made by the active blade with the horizontal plane defined by the roll and pitching axes of the aerodyne, causing the counterweight to approach the rotor mast when the cone angle of the blade increases, to balance centrifugal forces on either side of the rotor mast.

8. The rotor according to claim 1, wherein the first and second portions, one carrying the active blade and the other carrying the counterweight respectively, are secured to each other and form a single structure that is both rigid and aerodynamically profiled to avoid generating aerodynamic lift in rotation, while also being hinged about the transverse axis intersecting exactly at the axis of rotation of the rotor.

9. The rotor according to claim 7, wherein a mechanical balancing device is arranged at least in part inside a rigid portion carrying the counterweight to cause said counterweight to move towards the axis of rotation of the rotor when the cone angle made by the active blade with the horizontal plane increases, to balance centrifugal forces, regardless of the position of the active blade.

10. The rotor according to claim 1, wherein the rotor is driven in rotation by a drive device masked inside a rigid portion carrying the counterweight, said drive device allowing lead/lag movements in rotation about the axis of rotation of the rotor to damp variations in the lead/lag forces of the active blade, said drive device including a damped drive abutment system.

11. The rotor according to claim 1, wherein an angular pitch or a blade angle of the active blade has an angle of incidence that is controlled by a longitudinal shaft system held and mounted to turn about its own axis by bearings and abutments, said shaft passing through a rigid portion carrying the active blade and being constrained, at its radially outer end relative to the axis of rotation of the rotor, to move in rotation with a root of said active blade, and being controlled by a pitch control rod connected by a pitch lever to a radially inner end of said shaft.

12. The rotor according to claim 1, wherein an angular pitch or a blade angle of the active blade is constant and optimized to offer maximum lift at a nominal speed of rotation of the rotor.

13. The rotor according to claim 1, wherein a pitch of the active blade of each of the at least two of the single-blades is adjusted collectively only, for equipping the aerodyne in which roll and pitching movements are controlled by rotors of stabilization that are located at tips of said fixed wing and/or at ends of the fuselage.

14. The rotor according to claim 1, wherein at least one of rigid portions respectively carrying the active blade and the counterweight is profiled to provide different aerodynamic resistances depending on the orientation of the relative airflow, with a profile of elliptical type on the leading edge, and a recessed profile on the trailing edge, each profile being oriented opposite to the other, and oppositely from one rigid portion to the other, when the aerodyne is in cruising flight, the relative airflow reduces torque on the two rigid portions driving the rotor, tending to cause the active blade to turn in the direction that enables it to generate lift.

15. The rotor according to claim 1, wherein at least one retractable mechanical locking element that is masked in the structure of the aerodyne is arranged to lock the rotor mechanically during cruising flight by bearing against at least one protuberance arranged on a rigid portion carrying the active blade and/or a rigid portion carrying said counterweight.

16. The rotor according to claim 1, wherein at least one mechanical locking device for locking the first portion carrying the active blade with respect to said transverse axis is provided, said locking device being secured firstly to the rotor mast and secondly having a locking element that is engageable in a female portion secured to the first portion carrying the active blade, and supporting a flyweight while being urging from at least one spring, when said rotor is rotating, centrifugal force acts on the flyweight to release the mechanical locking device that locks the first portion carrying the active blade in a horizontal position when the rotor is stopped.

17. The rotor according to claim 1, wherein said counterweight is placed at an end of an extender element extending the rigid portion carrying the counterweight, said extender element having a profile that is either cylindrical substantially circular, or oval and oriented to reduce aerodynamic resistance when the rotor is rotating and a large vertical air stream is generated by the active blade, or is surrounded by an aerodynamically profiled fairing that is free to turn to become oriented and reduce aerodynamic resistance regardless of the direction of the air stream.

18. The rotor according to claim 1, wherein the rotor is driven in rotation during vertical flight by ejecting compressed air from the counterweight carried by an extender element of a rigid portion carrying the counterweight.

19. The rotor according to claim 18, wherein a rotor synchronizing and restarting gearbox is associated with a brake and with at least one electric motor together with its transmission system.

20. The rotor according to claim 1, wherein a tip of the active blade is provided with a fin steering device that can be raised by pivoting about the longitudinal axis of the active blade, such that when the rotor is no longer driven in rotation, said fin is raised and subjected to the effect of the relative airflow so that the corresponding single-blade is oriented substantially along the direction of the roll axis of the aerodyne.

21. The rotor according to claim 1, wherein said active blade of each of the at least one single-blade has two active blades carried by a rigid portion of the first portion of the at least one single-blade, and wherein said two active blades are spaced apart from each other in a V-configuration having an angle of at least 30°, lying substantially in a plane of a corresponding rotor disk.

22. A hybrid type aerodyne provided with the rotor according to claim 1, for vertical flight, and with the fixed wing, supported by the fuselage, and fitted with rotors of stabilization at tips of the wings and/or at ends of the fuselage to control roll and pitching movements of the aerodyne, together with at least one propeller, for propelling the aerodyne during cruising flight.

23. The aerodyne according to claim 22, wherein each of said rotors of stabilization is configured as a main vertical flight lift rotor, and each of said rotors of stabilization is one single-blade with a counterweight.

24. The rotor according to claim 1, wherein an angular pitch or a blade angle of the active blade is controlled by a longitudinal shaft system held and mounted to turn about its own axis passing through said first portion, moving in rotation with a root of said active blade, and controlled by a pitch control rod connected to said longitudinal shaft system by a pitch lever.

25. The rotor according to claim 1, wherein a blade angle of the active blade is constant and fixed at a value offering maximum lift at a nominal speed of rotation of the rotor.

26. The rotor according to claim 1, wherein said stopped position is locked longitudinally by a mechanical locking element that is masked in the fuselage of the aerodyne and arranged, during cruising flight, to bear against at least one protuberance arranged on at least one of said first or second portions.

27. The rotor according to claim 1, wherein said stopped position is locked horizontally by at least a mechanical locking device having a male element supported by said rotor mast and engageable in a female element secured to said first portion, said male element being subjected to antagonist forces coming from a spring and a flyweight coupled to said male element and moved by centrifugal force, said flyweight disengages when said rotor is rotating, and the spring engages the male and female elements when the rotor is stopped.

\* \* \* \* \*